(12) United States Patent
Koike et al.

(10) Patent No.: US 7,771,121 B2
(45) Date of Patent: Aug. 10, 2010

(54) BEARING ASSEMBLY WITH BUILT-IN ABSOLUTE ENCODER

(75) Inventors: Takashi Koike, Iwata (JP); Tomomi Ishikawa, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/385,582

(22) Filed: Apr. 13, 2009

(65) Prior Publication Data

US 2009/0202185 A1 Aug. 13, 2009

Related U.S. Application Data

(62) Division of application No. 10/968,119, filed on Oct. 20, 2004, now Pat. No. 7,537,388.

(30) Foreign Application Priority Data

Oct. 22, 2003 (JP) .............................. 2003-361434
Oct. 22, 2003 (JP) .............................. 2003-362044

(51) Int. Cl.
*F16C 33/76* (2006.01)

(52) U.S. Cl. ............... 384/448; 324/207.2; 324/207.14; 324/207.25

(58) Field of Classification Search ................... 384/448; 324/207.14, 252, 207.2, 207.25; 340/870.31
See application file for complete search history.

(56) References Cited

U.S. PATENT DOCUMENTS 4,707,695 A 11/1987 Takahashi et al.

5,130,650 A 7/1992 Lemarquand
2003/0173956 A1 9/2003 Fujikawa et al.

FOREIGN PATENT DOCUMENTS

| EP | 0 372 136 | 6/1990 |
|----|-----------|--------|
| JP | 61-97518 | 5/1986 |
| JP | 9-15252 | 1/1997 |
| JP | 11-194009 | 7/1999 |

OTHER PUBLICATIONS

Fujikawa Yoshio, et al., Patent Abstracts of Japan, "Bearing With Absolute Encoder", Publication No. 2004-004028 and Publication Date: Jan. 8, 2004.
U.S. Appl. No. 10/968,119, filed Oct. 20, 2004, Takashi Koike et al., NTN Corporation.
Japanese Office Action mailed Sep. 8, 2009 in corresponding Japanese Patent Application 2003-362044.

*Primary Examiner*—William C Joyce

(57) ABSTRACT

The bearing assembly includes a rolling bearing including a rotatable raceway member and a stationary raceway member. This bearing assembly also includes a to-be-detected member carried by the raceway member and having a magnetic characteristic which cyclically varies in a direction circumferentially of the to-be-detected element and has a cycle matching with one complete rotation of the raceway member, a magnetic sensor unit carried by the raceway member in face-to-face relation with the to-be-detected member, and a magnetic detecting circuit to supply an electric power to the unit and to process an output signal from the unit to provide an output to an external circuit. The magnetic characteristic of the to-be-detected member represents a substantially sinusoidal waveform rising and falling more steeply than a sinusoidal waveform at a zero-crossing point.

2 Claims, 17 Drawing Sheets

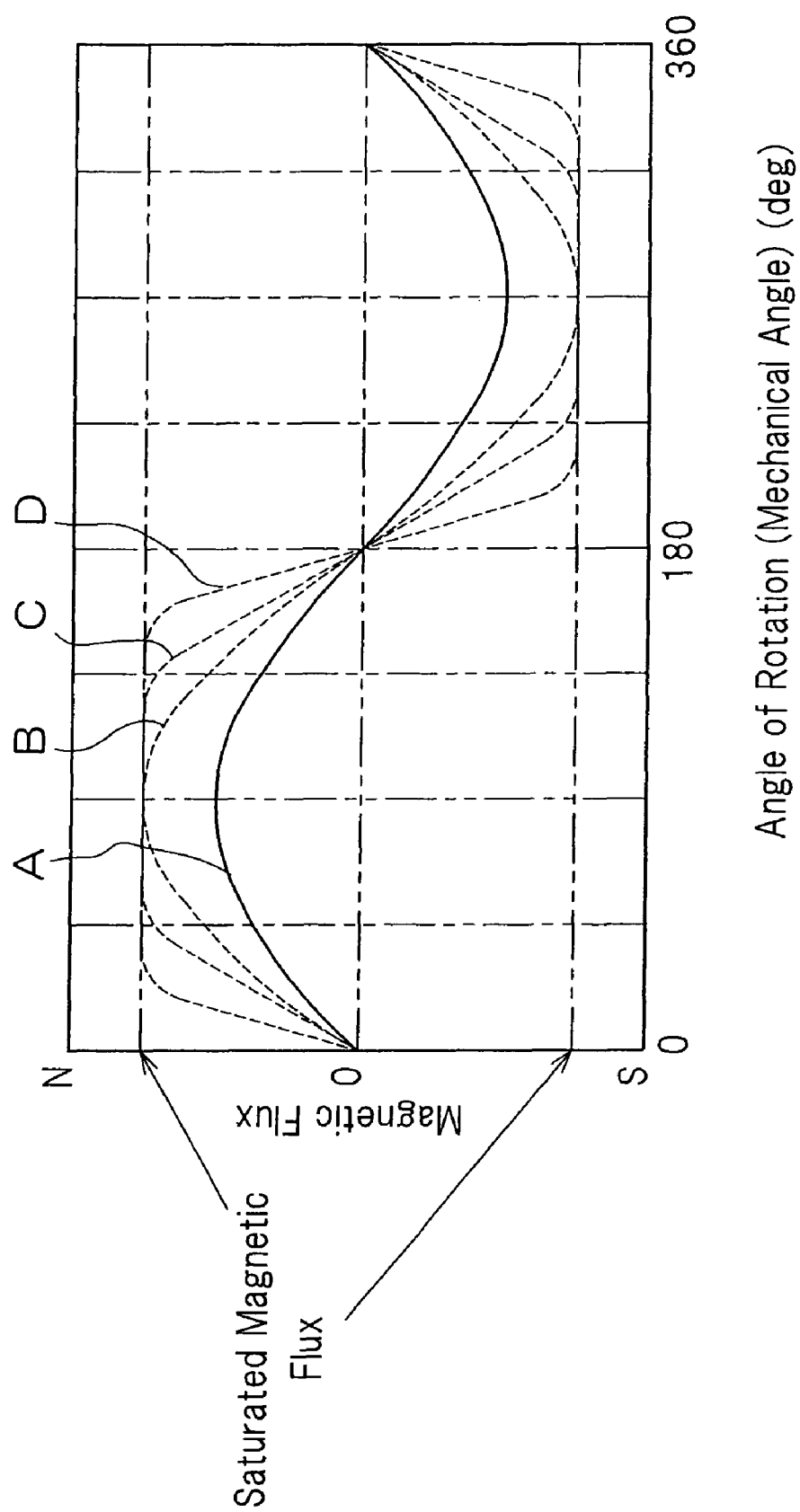

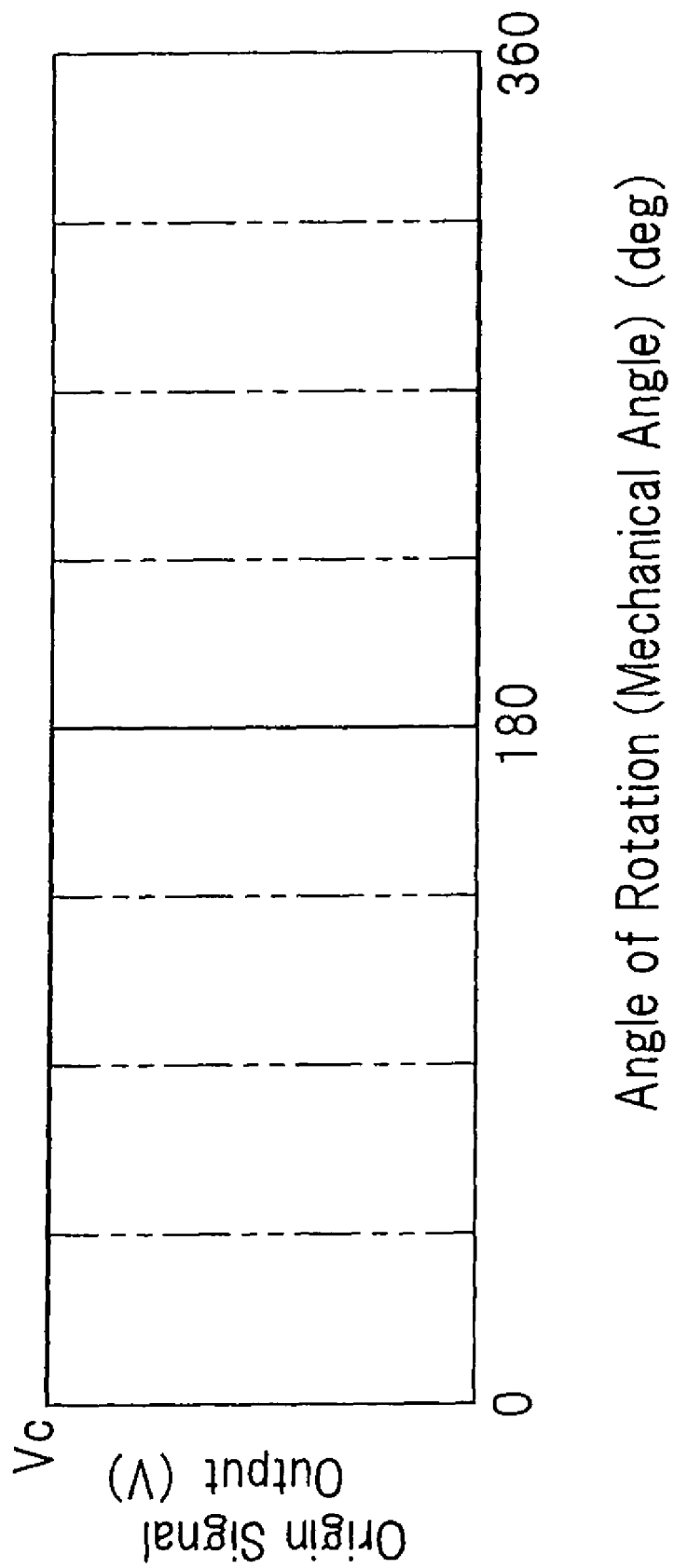

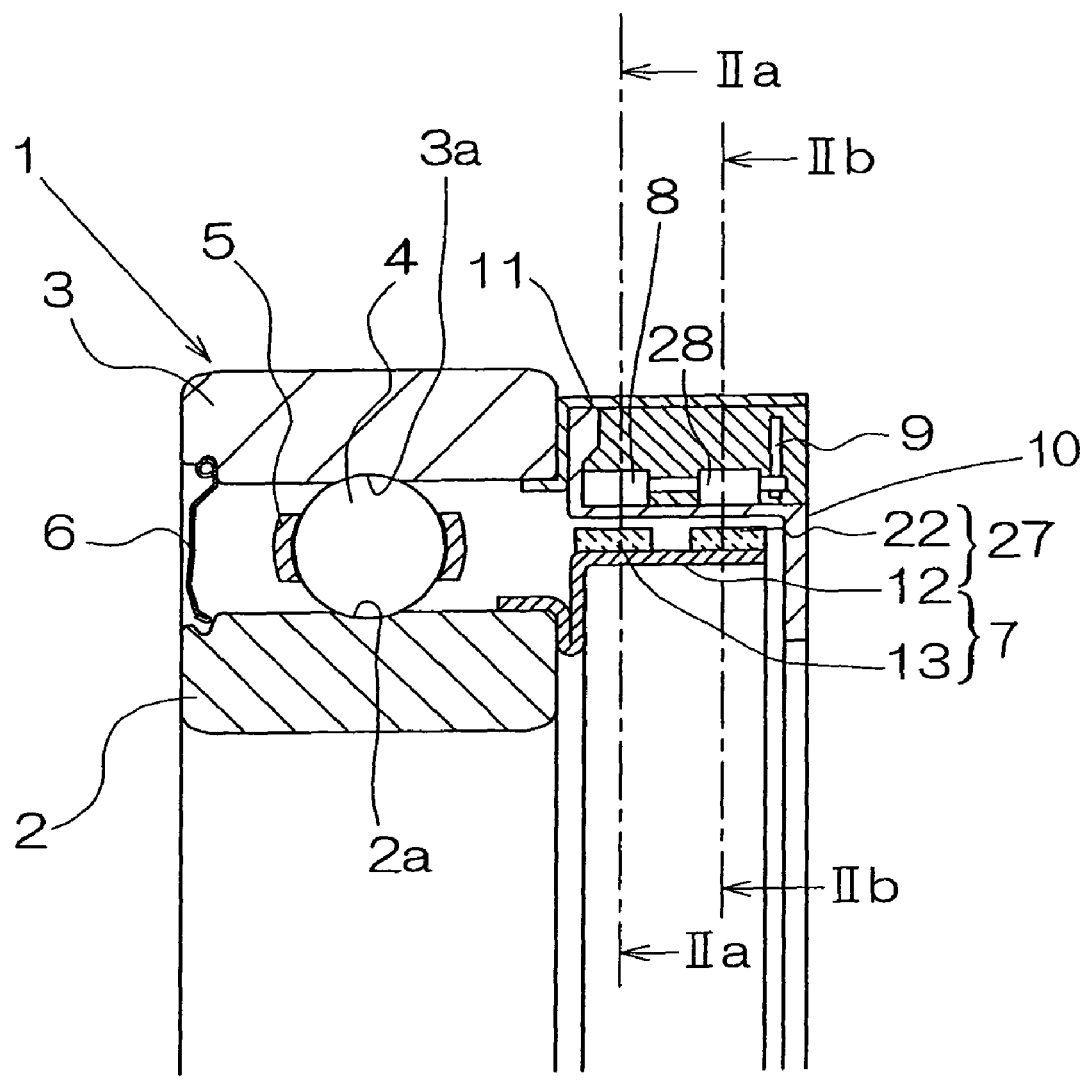

Angle of Rotation (Mechanical Angle) (deg)

Angle of Rotation (Mechanical Angle) (deg)

BEARING ASSEMBLY WITH BUILT-IN ABSOLUTE ENCODER

CROSS-REFERENCE TO RELATED APPLICATIONS

This application is a U.S. divisional application filed under 35 USC 1.53(b) claiming benefit of U.S. Ser. No. 10/968,119 filed in the United States on Oct. 20, 2004, now U.S. Pat. No. 7,537,388 which claims earlier benefit to Japanese Patent Application Nos. 2003-361434 and 2003-362044 filed with the Japanese Intellectual Property Office on Oct. 22, 2003, the disclosures of which are incorporated herein by reference in their entirety.

BACKGROUND OF THE INVENTION

1. Field of the Invention

The present invention relates to a bearing assembly having an absolute encoder built therein, which has a capability of detecting the absolute angle of rotation and can be employed in various equipments such as articulates of a robot or articulated manipulator.

2. Description of the Related Art

In view of the easiness to assemble compact, a rolling bearing assembly having a rotation sensor built therein is currently placed in the market, an example of which is shown in FIG. 11 of the accompanying drawings. The rolling bearing assembly 51 in FIG. 11 includes an inner race 52, which is a rotatable raceway member, an outer race 53, which is a stationary raceway member and encloses the inner race 52 with a cylindrical bearing space defined therebetween, and a circumferential row of rolling elements 54 rollingly retained by a roller retainer 55 and interposed between the inner and outer races 52 and 53.

An annular magnetic encoder 56 is secured to one end of the inner race 52 for rotation together therewith and is employed in the form of, for example, an annular rubber magnet having a plurality of opposite magnetic N and S poles alternating with each other in a direction circumferentially thereof. Cooperable with the annular magnetic encoder 56 is a magnetic sensor 57, which is in the form of, for example, a Hall element and secured to a corresponding end of the outer race 53 in face-to-face relation with the magnetic encoder 56. The magnetic sensor 57 is resin molded or encapsulated in a resinous casing 58, which is in turn fixedly mounted on the outer race 53 by means of a metallic casing 59.

In the rolling bearing assembly 51 of the above structure, the magnetic sensor 57 detects alternating change in magnetic poles of the magnetic encoder 56, as shown in FIG. 12, during rotation of the inner race 52 and subsequently outputs a train of incremental pulses, as shown in FIG. 13, which is descriptive of the number of revolutions, or the rotational speed, of the inner race 52.

It has, however, been found that with the rotation sensor of the structure described above, although the incremental pulse signal descriptive of the rotational speed of the inner race 52 is obtained, the rotation sensor is unable to provide the absolute angle of rotation of the inner race 52, unless the power-on initialization of the rotation sensor is carried out before counting of the pulses starts.

In order to alleviate the above discussed inconvenience, the Japanese Laid-open Patent Publication No. 2004-4028, published Jan. 8, 2004, for example, discloses, as shown in FIG. 14, a bearing assembly with a built-in absolute encoder, in which a radial type to-be-detected element 61, mounted on an inner race, has a magnetic characteristic varying in a substantially sinusoidal waveform having a cycle matching with one complete rotation of the inner race. A magnetic sensor unit 60 for detecting change in magnetism of the to-be-detected element 61 is comprised of two magnetic sensors 60A and 60B arranged at respective locations radially outwardly of the to-be-detected element 61 and spaced a predetermined angular distance from each other in a direction circumferentially of the to-be-detected element 61.

According to the above structure, since the magnetic characteristic of the to-be-detected element 61 is so designed as to vary with each cycle matching with one complete rotation of the inner race, the magnetic sensor unit 60 can easily output a signal indicative of the absolute angle of rotation. Also, when an output indicative of the difference between respective outputs from the two magnetic sensors 60A and 60B is subjected to rectangular pulse shaping, a rectangular signal of a cycle matching with one complete rotation of the inner race can be obtained as an origin signal, i.e., a signal indicative of the original angular position of the inner race.

Alternatively, a sinusoidal output generated from one of the two magnetic sensors 60A and 60B is compared with a center voltage intermediate of the amplitude of such sinusoidal output to provide a rectangular signal, which can be used as the origin signal.

However, the absolute encoder disclosed in the above discussed patent publication is unable to provide the origin signal of a high accuracy since it tends to be adversely affected by variation in threshold value between the magnetic sensors 60A and 60B and/or decrease in magnetism of the to-be-detected element 61 under the influence of temperatures. As such, where the repeatability of the origin signal is strictly required, it is necessary to employ, in addition to a combination of the to-be-detected element 61 and its cooperating magnetic sensor unit 60 associated with the detection of the absolute angle of rotation, an additional combination of a to-be-detected element and an additional magnetic sensor unit associated with the detection of the original position, so that an origin signal can be generated.

In order to alleviate the foregoing problems and inconveniences, the previously discussed patent publication also discloses an absolute encoder of an alternative structure, in which as shown in FIG. 15, a combination of a to-be-detected element 67 and a magnetic sensor unit 68 for the detection of the absolute angle of rotation and a combination of a to-be-detected element 87 and a magnetic sensor unit 88 for the detection of the original position are employed.

Referring to FIG. 15, the inner race 52 carries not only the first to-be-detected element 67 associated with the detection of the absolute angle of rotation, but also the second to-be-detected element 87 associated with the detection of the original position and, on the other hand, the outer race 53 carries not only the first magnetic sensor unit 68 cooperable with the to-be-detected element 67, but also the second magnetic sensor unit 88 cooperable with the to-be-detected element 87. The first to-be-detected element 67 for the detection of the absolute angle of rotation is of a radial type, in which as shown in FIG. 16A in a transverse sectional representation, the pattern of magnetization varies in a substantially sinusoidal waveform with a cycle matching with one complete rotation of the inner race 52. The first magnetic sensor unit 68 for the detection of the absolute angle of rotation is comprised of two magnetic sensors 68A and 68B arranged at respective locations radially outwardly of the to-be-detected element 67 and spaced a predetermined angular distance, for example, 90° from each other in a direction circumferentially of the to-be-detected element 67. Using respective outputs from the two magnetic sensors 68A and 68B, it is possible to determine the quadrant and, hence, the absolute angle of rotation of the inner race 52 can be indicated.

On the other hand, the second to-be-detected element 87 for the detection of the original position is also of a radial type, in which as shown in FIG. 16B in a transverse sectional representation, the pattern of magnetization is such that a pair of magnetic N and S poles is created in a direction circumferentially thereof or, alternatively, a single pole, for example, S pole is created in a direction circumferentially thereof. The second magnetic sensor unit 88 for the detection of the original position is comprised of a single magnetic sensor of a latch type or a switch type capable of generating an output signal corresponding to the magnetic flux density. As the inner race 52 rotates, the second magnetic sensor unit 88 provides the origin signal in terms of change in magnetism of the pair of N and S poles of the second to-be-detected element 87.

It has, however, been found that if the distance D between the first to-be-detected element 67 and the second to-be-detected element 87, as well as the distance D' between the first magnetic sensor unit 68 and the second magnetic sensor unit 88, is small as shown in FIG. 17A, respective leakage fluxes from the first and second to-be-detected elements 67 and 87 will interfere with each other. Where the second to-be-detected element 87 is magnetized to have a single S pole, the magnetic characteristic of the first to-be-detected element 67 in a direction radially thereof will be such as shown in FIG. 17B and the magnetic characteristic of the second to-be-detected element 87 in a direction radially thereof will be such as shown in FIG. 17C.

Under these conditions, a considerable error tends to occur in the absolute angle of rotation represented by the output signals from the magnetic sensors 68A and 68B forming respective parts of the first magnetic sensor unit 68. Also, the output from the second magnetic sensor unit 88 associated with the detection of the original position is latched (or switched) in the vicinity of a region where the magnetic flux of the to-be-detected element 87 decreases to zero, not in the vicinity of the single S pole where the magnetic flux of the to-be-detected element 87 varies considerably and, therefore, the accuracy of the origin detection signal tends to be lowered.

SUMMARY OF THE INVENTION

In view of the foregoing, it is an object of the present invention to provide a bearing assembly having an absolute encoder built therein, which is capable of detecting the absolute angle of rotation and also capable of providing a highly accurate origin signal, i.e., a highly accurate signal indicative of the original position, with no need to use any additional to-be-detected element separate from that for the detection of the absolute angle of rotation.

It is another object of the present invention to provide the bearing assembly having the absolute encoder of the type referred to above, which is effective to accurately detect the absolute angle of rotation and the original position.

In order to accomplish the foregoing objects of the present invention, the present invention in accordance with one aspect thereof provides a bearing assembly having an absolute encoder built therein, which includes a rolling bearing including a rotatable raceway member, a stationary raceway member enclosing the rotatable raceway member with a cylindrical bearing space defined between it and the rotatable raceway member, and a circumferential row of rolling elements rollingly housed within the cylindrical bearing space and interposed between the rotatable and stationary raceway members. This bearing assembly also includes a to-be-detected element carried by the rotatable raceway member and having a magnetic characteristic which cyclically varies in a direction circumferentially thereof and has a cycle, relative to the magnetic sensor unit, matching with one complete rotation of the rotatable raceway member, a magnetic sensor unit carried by the stationary raceway member in face-to-face relation with the to-be-detected element, and a magnetic detecting circuit for supplying an electric power to the magnetic sensor unit and for processing an output signal from the magnetic sensor unit to provide an output to an external circuit. In this bearing assembly, the magnetic characteristic of the to-be detected element represents a substantially sinusoidal waveform rising and falling more steeply than a sinusoidal waveform at a zero-crossing point. The magnetic detecting circuit outputs a detection signal indicative of the absolute angle of the rotatable raceway member and an origin signal indicative of an original position of the rotatable member.

According to this aspect of the present invention, since the magnetic characteristic of the to-be detected element varies cyclically with each cycle matching with one complete rotation of the rotatable raceway member, it is possible to detect the absolute angle of rotation of the rotatable raceway member. Also, since the magnetic characteristic of the to-be-detected element represents a substantially sinusoidal waveform rising and falling more steeply than a sinusoidal waveform at a zero-crossing point, it is possible to generate a highly accurate origin signal by the utilization of the output signal from the magnetic sensor unit. Thus, the absolute angle can be detected and, with no need to use any extra to-be-detected element separate from that for the detection of the absolute angle, a highly accurate origin signal can be obtained.

It is, however, to be noted that the magnetic detecting circuit may be of a type capable of outputting only the origin signal by processing the output signal from the magnetic sensor unit and having no function of outputting the detection signal indicative of the absolute angle.

In the practice of the above described aspect of the present invention, the magnetic sensor unit may include a plurality of magnetic sensors, in which case at least one of those magnetic sensors may be used as an origin signal generator for generating the origin signal indicative of the original position of the rotatable raceway member.

The use of the plural magnetic sensors makes it easy to detect the absolute angle of the rotatable raceway member by detecting the to-be-detected element which varies cyclically with each cycle matching with one complete rotation of the rotatable raceway member. For the origin signal generator, either one of the magnetic sensors used for the detection of the absolute angle or one of the other magnetic sensors may be employed. If one of the magnetic sensors for the detection of the absolute angle is used for the detection of the original position, the number of the magnetic sensors to be used can advantageously be reduced, resulting in simplification of the structure. On the other hand, if a dedicated magnetic sensor is used for the detection of the original position, a magnetic sensor having a characteristic suitable for the detection of the original position can be employed and, therefore, a further highly accurate origin signal can be obtained.

Preferably, at least one of the magnetic sensors, which is used as the origin signal generator, may be a Hall IC of a latch type or a switch type. In this case, the output from the magnetic sensor forming the origin signal generator is in the form of a rectangular shaped origin signal.

Also preferably, the origin signal may be used for a detection of a direction in which the rotatable raceway member is returned to the original position. By way of example, if the bearing assembly with the absolute encoder built therein in accordance with the present invention is incorporated in a device such as a manipulator arm device, in which the angle of rotation of a manipulator arm is limited, the direction in which the rotatable raceway member, that is, the manipulator arm is returned to the original position can be readily ascertained. Thus, where the bearing assembly with the absolute encoder built therein according to the present invention is used to rotatably support a movable component, such as the manipulator arm of the manipulator arm device, of which the angle of rotation is limited, the origin signal may be utilized in a control unit which drives the movable component, so that at the time the electric power is turned on, the direction of rotation of the movable component back to the original position can be detected.

The present invention in accordance with another aspect thereof also provides a bearing assembly having an absolute encoder built therein, which includes a rolling bearing including a rotatable raceway member, a stationary raceway member enclosing the rotatable raceway member with a cylindrical bearing space defined between it and the rotatable raceway member, and a circumferential row of rolling elements rollingly housed within the cylindrical bearing space and interposed between the rotatable and stationary raceway members. This bearing assembly also includes a first to-be-detected element for a detection of an absolute angle, which is carried by the rotatable raceway member and has a magnetic characteristic cyclically varying in a direction circumferentially of the first to-be-detected element, a first magnetic sensor unit for the detection of the absolute angle, which is carried by the stationary raceway member in face-to-face relation with the first to-be-detected element, a second to-be-detected element for a detection of an original position, which is carried by the rotatable raceway member at a location separate from the first to-be-detected element and has a magnetic characteristic of a single pole or a single pair of N and S poles, a second magnetic sensor unit for the detection of the original position, which is carried by the stationary raceway member in face-to-face relation with the second to-be-detected element, and a magnetic detecting circuit for supplying an electric power to the first and second magnetic sensor units and for processing respective output signals from the first and second magnetic sensor units to generate to an external circuit a signal indicative of the absolute angle of rotation of the rotatable raceway member and an origin signal indicative of the original position of the rotatable raceway member during one complete rotation of the rotatable raceway member relative to the stationary raceway member.

In this bearing assembly according to the second aspect of the present invention, a combination of the first to-be-detected element and the first magnetic sensor unit for the detection of the absolute angle and a combination of the second to-be-detected element and the second magnetic sensor unit for the detection of the original position are so positioned as to be immune from leakage fluxes emanating from the first and second to-be-detected elements, respectively. In other words, the first and second to-be-detected elements and the first and second magnetic sensor units are properly positioned relative to each other so that the leakage flux emanating from the first to-be-detected element for the detection of the absolute angle will not substantially affect the sensitivity of the second magnetic sensor unit for the detection of the original position and the leakage flux emanating from the second to-be-detected element for the detection of the original position also will not substantially affect the sensitivity of the first magnetic sensor unit for the detection of the absolute angle.

According to the second aspect of the present invention, the use of the combination of the first to-be-detected element and the first magnetic sensor unit for the detection of the absolute angle and the combination of the second to-be-detected element and the second magnetic sensor unit for the detection of the original position is effective to obtain the absolute angle of rotation of the rotatable raceway member and also effective to provide the origin signal indicative of the original position of the rotatable raceway member during one rotation of the rotatable raceway member, with no need to perform any power-on initialization. In particular, since in this aspect of the present invention the combination of the first to-be-detected element and the first magnetic sensor unit for the detection of the absolute angle and the combination of the second to-be-detected element and the second magnetic sensor unit for the detection of the original position are so positioned that they will not be adversely affected by the leakage fluxes emanating from the first and second to-be-detected elements, the detection signal outputted from each of the first and second magnetic sensor units is free from any adverse influence by the leakage fluxes, and, therefore, the absolute angle of rotation and the origin signal can be outputted with high accuracy.

In the practice of the second aspect of the present invention, the first to-be-detected element may have a magnetic characteristic cyclically varying with each cycle matching with one complete rotation of the rotatable raceway member and the first and second to-be-detected elements are preferably disposed on a common cylindrical surface but spaced axially from each other.

According to this feature, since the magnetic characteristic of the first to-be-detected element varies cyclically with each cycle matching with one complete rotation of the rotatable raceway member, a simplified calculating process can be carried out in the magnetic detecting circuit to provide the absolute angle of rotation. Also, since the first and second to-be-detected elements are preferably disposed on the common cylindrical surface, the first and second to-be-detected elements can be disposed with a simplified structure.

Also, in one embodiment, the first to-be-detected element and the second to-be-detected element may be axially spaced a distance of 1 mm or more. If the axial distance between the first and second to-be-detected elements is 1 mm or more, it is possible to protect the respective sensitivities of the first and second magnetic sensor units from being adversely affected by the leakage fluxes emanating from the first and second to-be-detected elements, respectively.

Preferably, in one embodiment, the first to-be-detected element may have a magnetic characteristic cyclically varying with each cycle matching with one complete rotation of the rotatable raceway member and the second to-be-detected element may be disposed with its direction of a magnetic field offset 90° from the direction of the magnetic field of the first to-be-detected element.

In this structural feature, since the magnetic characteristic of the first to-be-detected element for the detection of the absolute angle varies cyclically with each cycle matching with one complete rotation of the rotatable raceway member, it is possible to easily obtain the absolute angle of rotation. Also, since the second to-be-detected element is disposed with the direction of its magnetic field offset 90° from that of the first to-be-detected element, as compared with the case in which the first and second to-be-detected elements are arranged in the same direction, it is possible to protect the combination of the first to-be-detected element and the first magnetic sensor unit and the combination of the second to-be-detected element and the second magnetic sensor unit from being adversely affected by the leakage fluxes emanating from the first and second to-be-detected elements, even though the distances, over which the first and second to-be-detected elements are spaced, are small.

Also, where the second to-be-detected element is disposed with its direction of a magnetic field offset 90° from the direction of the magnetic field of the first to-be-to-be-detected element, the first and second to-be-detected elements are preferably spaced an axial distance of 0.5 mm or more and a radial distance of 0.5 mm or more from each other.

Where the second to-be-detected element is disposed with the direction of its magnetic field offset 90° from the direction of the magnetic field of the first to-be-to-be-detected element, selection of the axial distance and the radial distance between the first to-be-detected element and the second to-be-detected element to be 0.5 mm or more is effective to protect the detection of the absolute angle and the original position from being adversely affected by the leakage fluxes emanating from the first and second to-be-detected elements.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 2 is a diagram showing the pattern of magnetization in a to-be-detected element employed in the bearing assembly;

FIG. 3 is a chart showing waveforms of a origin signal generated by a magnetic sensor unit employed in the bearing assembly;

FIG. 6 is a fragmentary longitudinal sectional view of a bearing assembly with a built-in absolute encoder according to a second preferred embodiment of the present invention;

DETAILED DESCRIPTION OF THE PREFERRED EMBODIMENTS

A first preferred embodiment of the present invention will be described in detail with particular reference to FIGS. 1A to 5.

Figure 1A:
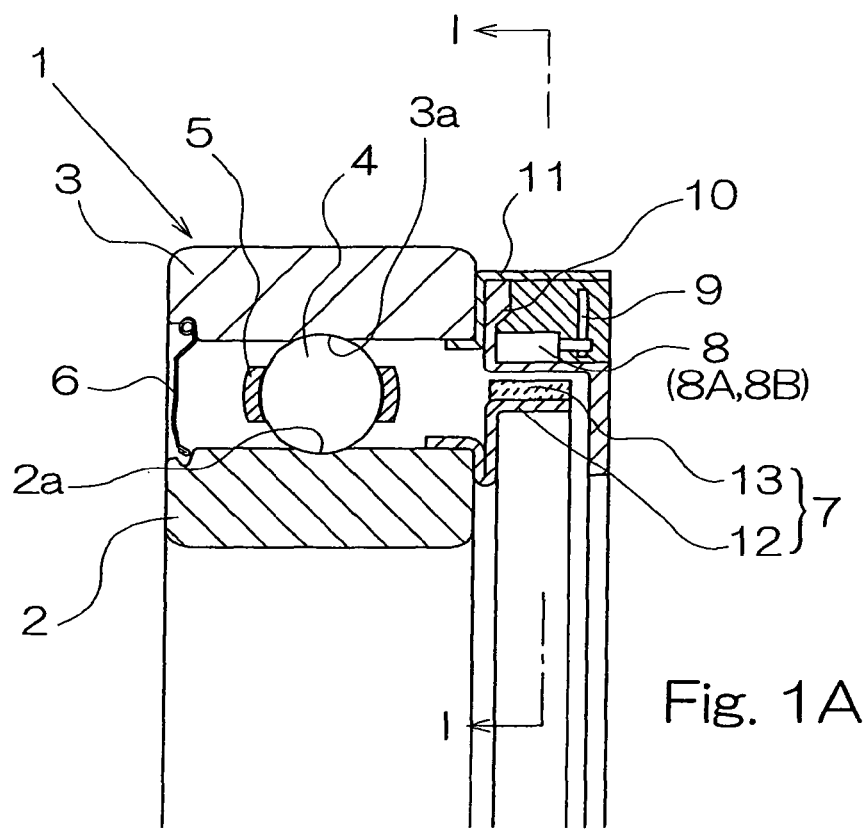
FIG. 1A is a fragmentary longitudinal sectional view of a bearing assembly with a built-in absolute encoder according to a first preferred embodiment of the present invention.

As shown in FIG. 1A, a rolling bearing assembly with a built-in absolute encoder according to a first embodiment of the present invention includes a rolling bearing unit 1 made up of a rotatable raceway member 2, a stationary raceway member 3 enclosing the rotatable raceway member 2 with a cylindrical bearing space defined between it and the rotatable raceway member 2, and a circumferential row of rolling elements 4 rollingly retained by a roller retainer 5 and interposed between the rotatable and stationary raceway members 2 and 3. The rotatable raceway member 2 and the stationary raceway member 3 are rotatable relative to each other. The rolling bearing assembly with the built-in absolute encoder also includes a to-be-detected element 7 secured to one end of the rotatable raceway member 2, a magnetic sensor unit 8 secured to one end of the stationary raceway member 3 in face-to-face relation with the to-be-detected element 7, and a magnetic detecting circuit 9. The magnetic detecting circuit 9 is preferably in the form of a printed circuit board having electric and/or electronic component parts mounted on one surface thereof, but may be in the form of an IC chip or any other circuit chip.

The rolling bearing unit 1 may be in the form of a deep groove ball bearing having inner and outer races, which define the rotatable and stationary raceway members 2 and 3, respectively. the rotatable raceway member 2 has an outer peripheral surface formed with at least one raceway groove 2*a* and the stationary raceway member 3 has an inner peripheral surface formed with a mating raceway groove 3*a*, and the rolling elements 4 rollingly retained by the roller retainer 5 and interposed between the rotatable and stationary raceway members 2 and 3 are in part received in the raceway groove 2*a* and in part in the raceway groove 3*a*. One of opposite annular open ends of the cylindrical bearing space delimited between the rotatable and stationary raceway members 2 and 3, which is remote from the to-be-detected element 7 and the magnetic sensor unit 8, is sealed by a sealing member 6.

The to-be-detected element 7 is of a radial type and is in the form of an annular component having a magnetic characteristic, relative to the magnetic sensor unit 8, cyclically varying in a direction circumferentially thereof. The magnetic characteristic of the element 7 varies cyclically relative to the magnetic sensor unit 8, with a cycle matching with one complete rotation of the rotatable raceway member 2.

Figure 1B:
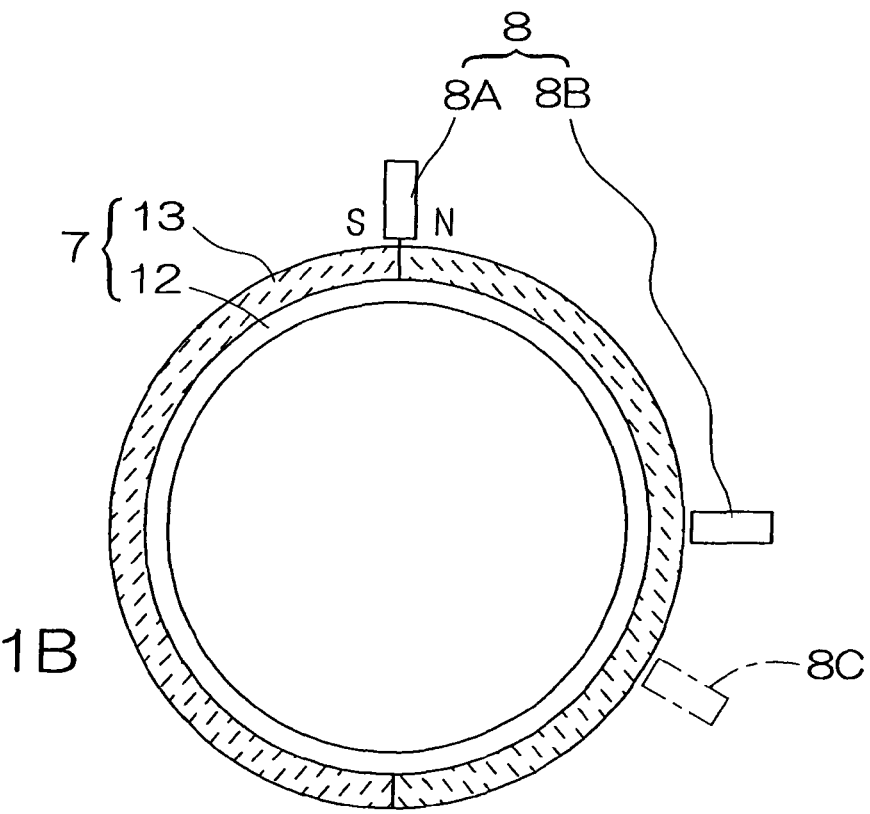
FIG. 1B is a cross-sectional view taken along the line I-I in FIG. 1A.

More specifically, as shown in FIG. 1B, the to-be-detected element 7 is made up of an annular backing metal 12 and a magnetic member 13 provided on an outer peripheral surface of the backing metal 12 and having N and S poles so magnetized as to alternate with each other in a direction circumferentially thereof. The magnetic member 13 has a pattern of magnetization represented by a substantially sinusoidal waveform having a cycle matching with one complete rotation of the rotatable raceway member 2. In particular, the substantially sinusoidal waveform representing the magnetic characteristic of the magnetic member 13 is so chosen that, as represented by any one of substantially sinusoidal waveforms B, C and D shown by broken lines in FIG. 2, steeper rise and fall than those of the sinusoidal waveform A can be exhibited in the vicinity of a zero-crossing point, at which the magnetic flux attains zero. It is to be noted that the substantially sinusoidal pattern of magnetization exhibits the rise and fall, as discussed above, which are steeper than those of the sinusoidal pattern of magnetization, in which the surface areas each bound by a half-cycle portion of the sinusoidal waveform and the coordinate axis representing the zero value remain the same.

The to-be-detected element 7 is fixedly mounted on the rotatable raceway member 2 through the backing metal 12. The magnetic member 13 is in the form of, for example, a rubber magnet bonded by vulcanization to the backing metal 12, but may be in the form of a plastic magnet or a sintered magnet, in which case the use of the backing metal 12 is not always essential and may be dispensed with.

As shown in FIG. 1A, the magnetic sensor unit 8 is made up of first and second magnetic sensors 8A and 8B each operable to generate an output signal corresponding to the magnetic flux density. As shown in FIG. 1B, the first and second magnetic sensors 8A and 8B, each being in the form of an analog sensor, are so arranged as to be spaced a predetermined angular distance, for example, 90° from each other in a circumferential direction. In practice, the first and second magnetic sensors 8A and 8B are surface mounted on a printed circuit board forming a part of the magnetic detecting circuit 9 and are, after having been inserted into a resinous casing 10 together with the printed circuit board of the magnetic detecting circuit 9, encapsulated in a resin molding. The resinous casing 10 so resin molded is fixed to the stationary raceway member 3 by means of a metallic casing 11 to secure the first and second magnetic sensors 8A and 8B and the magnetic detecting circuit 9 to the stationary raceway member 3.

The magnetic detecting circuit 9 is operable to supply an electric power to the magnetic sensor unit 8 and to process an output signal from the magnetic sensor unit 8 before it generates an output signal to an external circuit. This magnetic detecting circuit 9 processes the output signal from the magnetic sensor unit 8 to generate an output indicative of the absolute angle of rotation of the rotatable raceway member 2 and an output indicative of the original position of the rotatable raceway member 2. The magnetic detecting circuit 9 may be disposed at a location external to the rolling bearing unit 1.

In the bearing assembly with the built-in absolute encoder of the structure described above, since the first and second magnetic sensors 8A and 8B are spaced in 90° phase offset relation to each other and the to-be-detected element 7 with magnetization of a substantially sinusoidal pattern is provided in which each cycle of the substantially sinusoidal waveform matches with one complete rotation of the rotatable raceway member 2, a quadrant determination is possible from the respective outputs of the first and second magnetic sensors 8A and 8B and, therefore, the absolute angle of rotation of the rotatable raceway member 2 can be measured.

Also, since the to-be-detected element 7 has such a magnetic characteristic that the substantially sinusoidal waveform rises and falls steeply in the vicinity of the zero-crossing point, not only can influences brought about by variation in threshold value between the first and second magnetic sensors 8A and 8B and/or demagnetization of the magnet by temperature be minimized, but also a highly accurate origin signal indicative of the original position of the rotatable raceway member 2 can be generated using the respective outputs from the first and second magnetic sensors 8A and 8B. For this reason, the bearing assembly of the present invention can be conveniently used in an application where the repeatability of the origin signal is strictly required.

In such case, generation of the origin signal may be accomplished either by shaping a signal indicative of the difference between the respective outputs from the first and second magnetic sensors 8A and 8B to provide a rectangular signal of a cycle matching with one complete rotation of the rotatable raceway member 2 to obtain the origin signal indicative of the original position of the rotatable raceway member 2, or by comparing the output from one of the magnetic sensors 8A and 8B with a center voltage corresponding to a value intermediate of the amplitude of the sinusoidal waveform to provide the rectangular signal to thereby obtain the origin signal.

By way of example, if the magnetic characteristic of the to-be-detected element 7 is such that the magnetic flux varies gradually in the vicinity of the zero crossing point, at which the magnetic flux attains zero, in a manner similar to the sinusoidal waveform A shown by the solid line in FIG. 2, the accuracy of detection of the absolute angle can be improved, but the origin signal generated by the above described process of detecting the original position will lack the repeatability of detection of the original position. However, where the magnetic characteristic of the to-be-detected element 7 is such that the magnetic flux steeply changes in the vicinity of the zero crossing point as represented by any one of the substantially sinusoidal waveforms B, C and D shown in FIG. 2, the bearing assembly can be conveniently used in an application where the repeatability of the origin signal is strictly required although the accuracy of detection of the absolute angle may be more or less lowered.

Also, as a modification of the illustrated embodiment, a third magnetic sensor 8C, which forms a means for generating the origin signal, may be employed in addition to the first and second magnetic sensors 8A and 8B. In such case, the third magnetic sensor 8C should be positioned at a location radially outwardly of the to-be-detected element 7 in coaxial relation therewith and in an out-of-phase relation with the first and second magnetic sensors 8A and 8B as shown by the phantom line in FIG. 1B. The third magnetic sensor 8C is in the form of a digital output sensor of a single sided or half wave magnetic responsive type (that is, a switch type) or of an alternating or full wave magnetic responsive type (that is, a latch type). For the third magnetic sensor 8C, a Hall IC, for example, can be employed.

The origin signal generated when the third magnetic sensor 8C is employed in the form of the digital output sensor of the alternating magnetic responsive type is shown in FIG. 3. As can readily be seen from FIG. 3, the origin signal can be obtained. Accordingly, in such case, the absolute angle can be obtained relying on the respective outputs from the first and second magnetic sensors 8A and 8B, which provide a substantially sinusoidal waveform signal and, on the other hand, the original position can be obtained relying on the output from the third magnetic sensor 8C, which provides a rectangular waveform signal.

Alternatively, as a second modification of the foregoing embodiment, one of the first and second magnetic sensors 8A and 8B may be dispensed with, in which case the substantially sinusoidal output from one of the first and second magnetic sensors 8A and 8B and the substantially rectangular output from the third magnetic sensor 8C are utilized to generate the angle detection signal indicative of the absolute angle. In such case, the absolute angle and the original position can be obtained from those two signals.

Again alternatively, as a third modification of the foregoing embodiment, the magnetic detecting circuit 8 may be of a circuit design, in which no means for calculating the absolute angle is employed, but only the output indicative of the original position can be generated. In such case, only one of the first to third magnetic sensors 8A to 8C is employed.

Figure 4A:
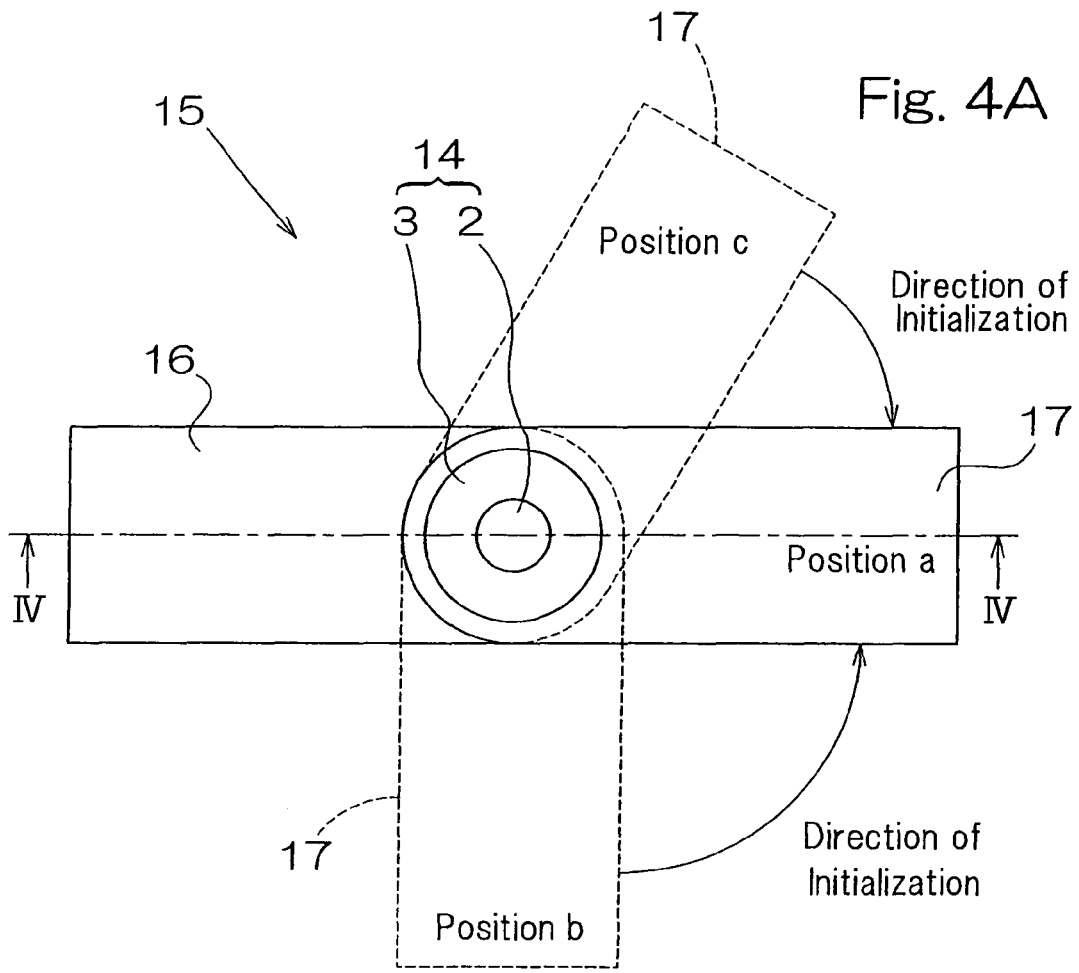
FIG. 4A is a top plan view of a manipulator arm device employing the bearing assembly of the present invention.
Figure 4B:
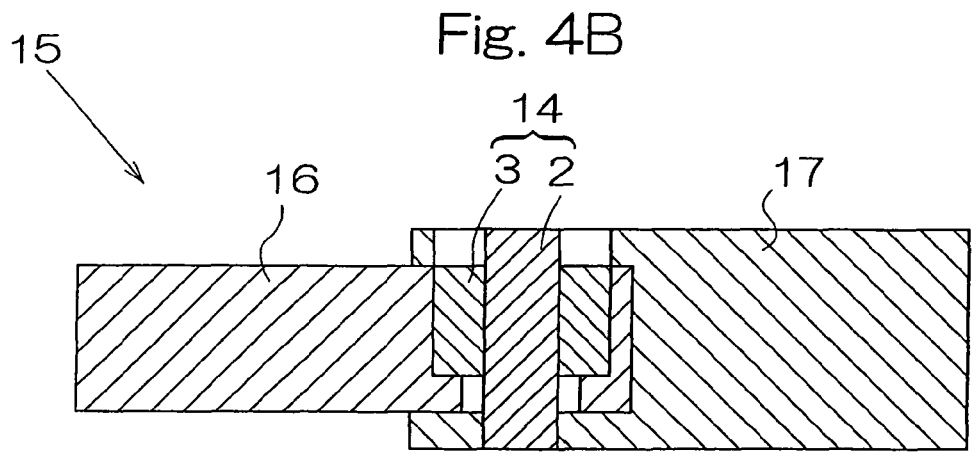
FIG. 4B is a cross-sectional view taken along the line IV-IV in FIG. 4A.

FIGS. 4A and 4B illustrate plan and sectional views of a manipulator arm device 15 utilizing the bearing assembly with the built-in absolute encoder according to the embodiment and modifications. The manipulator arm device 15 includes a first arm 16 fixedly coupled with the outer race 3 of the bearing assembly 14 and a second arm 17 fixedly coupled with the inner race of the bearing assembly 14. In this application, the respective angles of rotation of the first and second arms 16 and 17 are limited by mechanical interference. By way of example, when the second arm 17 is driven by an actuator (not shown) as shown by the broken line in FIG. 4A, although the absolute position of the second arm 17 can be determined by the bearing assembly 14 at the time the device 15 is powered on, it is necessary, where the position of the arm is desired to be detected highly accurately, to perform an initialization to return the second arm 17 back to the original position by the utilization of a highly accurate origin detecting function possessed by the bearing assembly 14. During this initialization, in order to avoid the mechanical interference, it is necessary to rotate the second arm 17 in a direction, in which the second arm 17 is rotated during the return movement, that is, in a direction towards the original position of the second arm 17. In such case, a means to determine which direction the second arm 17 should be driven relative to the original position is necessary.

Figure 5:
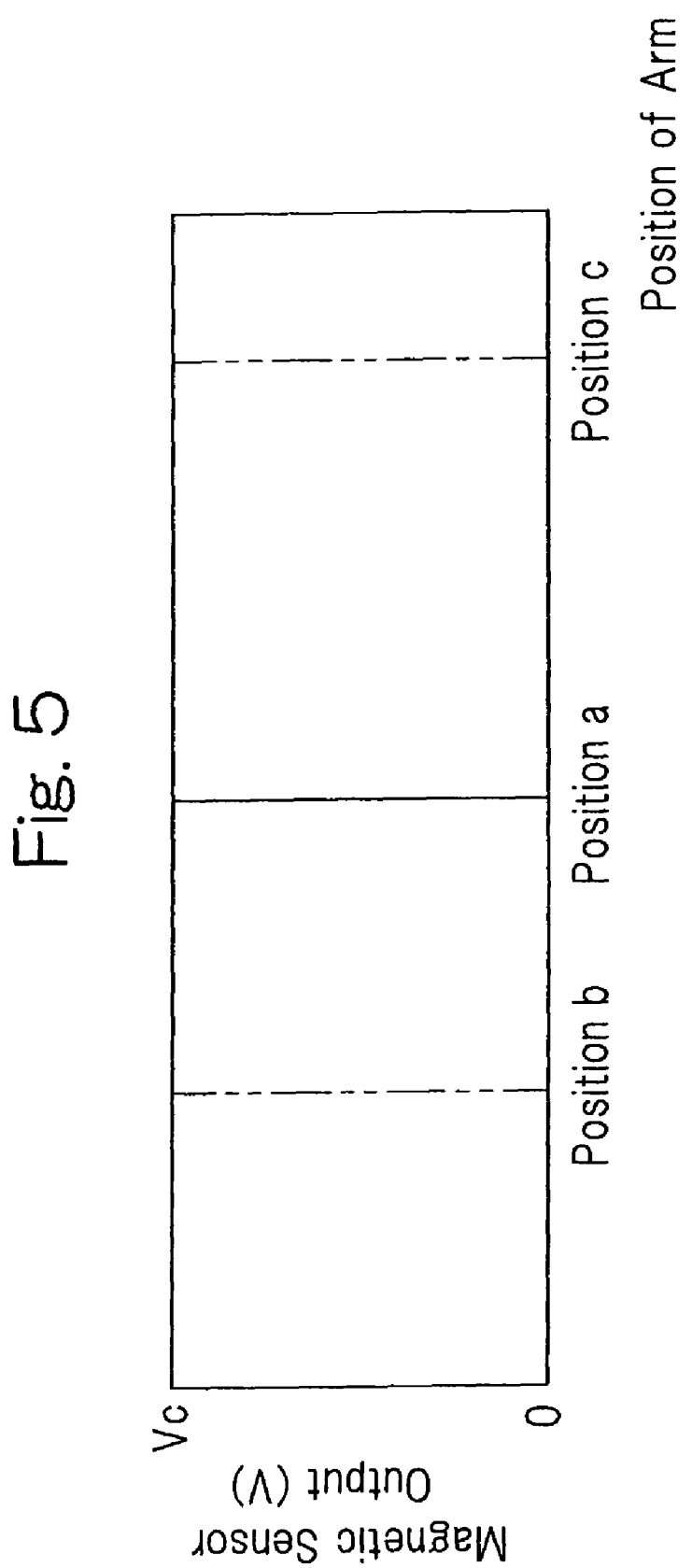
FIG. 5 is an explanatory diagram showing the relation between the position of a second arm of the manipulator arm device and the origin signal.

The manner in which the direction of rotation of the arm back to the original position is detected using only the origin signal will now be described. Let it be assumed that referring to FIG. 4A, at the original position a of the second arm 17 the bearing assembly 14 performs a detection of the original position. When the second arm 17 is driven, the relation between the origin signal generated by the magnetic sensor 8C or the origin signal generated by processing the detection signal outputted from either one of the magnetic sensors 8A and 8B and the position of the second arm 17 is such as shown in FIG. 5. In other words, assuming, for example, that the second arm 17 has been driven to the position b shown in FIG. 4A, the origin signal is held in a high level state and, therefore, it can be ascertained that the direction in which the second arm 17 has to be driven in order for it to return to the original position a from the position b is a counterclockwise direction. On the other hand, if the second arm 17 has been driven to the position c, the origin signal is held in a low level state and, therefore, it can be ascertained that the direction in which the second arm 17 has to be driven in order for it to return to the original position a from the position c is a clockwise direction.

In this embodiment, the direction towards the original position may be detected from a detected value of the absolute position of the arm, but with the means utilizing the origin signal shown in FIGS. 4A to 5, the direction of rotation of the second arm 17 back to the original position can be detected with no need to detect the absolute angle. Because of this, the magnetic detecting circuit may be of a type from which a calculating circuit or the like for calculating the absolute angle is eliminated.

Referring now to FIG. 6, there is shown the bearing assembly with the built-in absolute encoder according to a second preferred embodiment of the present invention. The bearing assembly includes a rolling bearing unit 1 made up of a rotatable raceway member 2, a stationary raceway member 3 enclosing the rotatable raceway member 2 with a cylindrical bearing space defined between it and the rotatable raceway member 2, and a circumferential row of rolling elements 4 rollingly retained by a roller retainer 5 and interposed between the rotatable and stationary raceway members 2 and 3. The bearing assembly also includes a first to-be-detected element 7 for the detection of the absolute angle, a second to-be-detected element 27 for the detection of the original position, a first magnetic sensor unit 8 for the detection of the absolute angle, a second magnetic sensor unit 28 for the detection of the original position, and a magnetic detecting circuit 9. The first and second to-be-detected elements 7 and 27 are axially juxtaposed relative to each other and are secured to one end of the rotatable raceway member 2, whereas the first and second magnetic sensor units 8 and 28 are axially juxtaposed relative to each other and are secured to one end of the stationary raceway member 3 in face-to-face relation with the first and second to-be-detected elements 7 and 27.

The rolling bearing unit 1 may be in the form of a deep groove ball bearing having inner and outer races, which define the rotatable and stationary raceway members 2 and 3, respectively. The rotatable raceway member 2 has an outer peripheral surface formed with at least one raceway groove 2a and the outer race or stationary raceway member 3 has an inner peripheral surface formed with a mating raceway groove 3a. The rolling elements 4 are in part received in the raceway groove 2a and in part in the raceway groove 3a. One of opposite annular open ends of the cylindrical bearing space delimited between the rotatable and stationary raceway members 2 and 3, which is remote from the first and second to-be-detected elements 7 and 27 and the magnetic sensors 8 and 28, is sealed by a sealing member 6.

The first to-be-detected element 7 is of a radial type and is in the form of an annular component having a magnetic characteristic cyclically varying in a direction circumferentially thereof relative to the magnetic sensor 8. The magnetic characteristic varies cyclically with a cycle matching with one complete rotation of the rotatable raceway member 2.

Figure 7A:
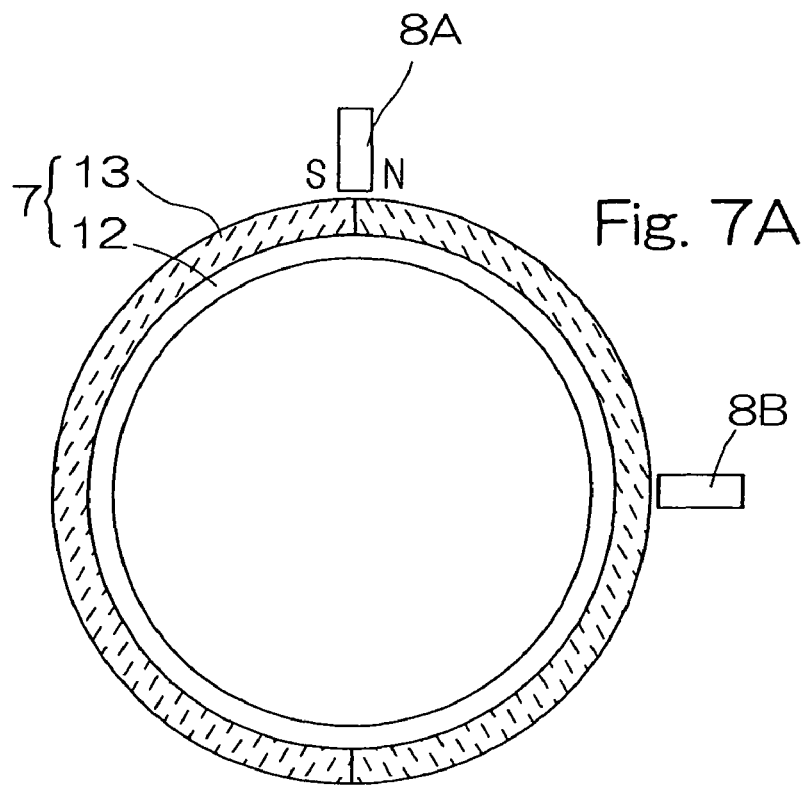
FIG. 7A is a cross-sectional view taken along the line IIa-IIa in FIG. 6.

More specifically, as shown in FIG. 7A, the to-be-detected element 7 is made up of an annular backing metal 12 and a magnetic member 13 provided on an outer peripheral surface of the backing metal 12 and having N and S poles so magnetized as to alternate with each other in a direction circumferentially thereof. The magnetic member 13 has a pattern of magnetization represented by a substantially sinusoidal waveform with each cycle matching with one complete rotation of the rotatable raceway member 2. The to-be-detected element 7 is fixedly mounted on the rotatable raceway member 2 through the backing metal 12. The magnetic member 13 is in the form of, for example, a rubber magnet bonded by vulcanization to the backing metal 12, but may be in the form of a plastic magnet or a sintered magnet.

As shown in FIG. 7A, the magnetic sensor unit 8 for the detection of the absolute angle is made up of first and second magnetic sensors 8A and 8B each operable to generate an output signal corresponding to the magnetic flux density. The first and second magnetic sensors 8A and 8B, each being in the form of an analog sensor, are so arranged as to be spaced a predetermined angular distance, for example, 90° from each other in a circumferential direction. The first and second magnetic sensors 8A and 8B are mounted on a circuit board having the magnetic detecting circuit 9.

Figure 8:
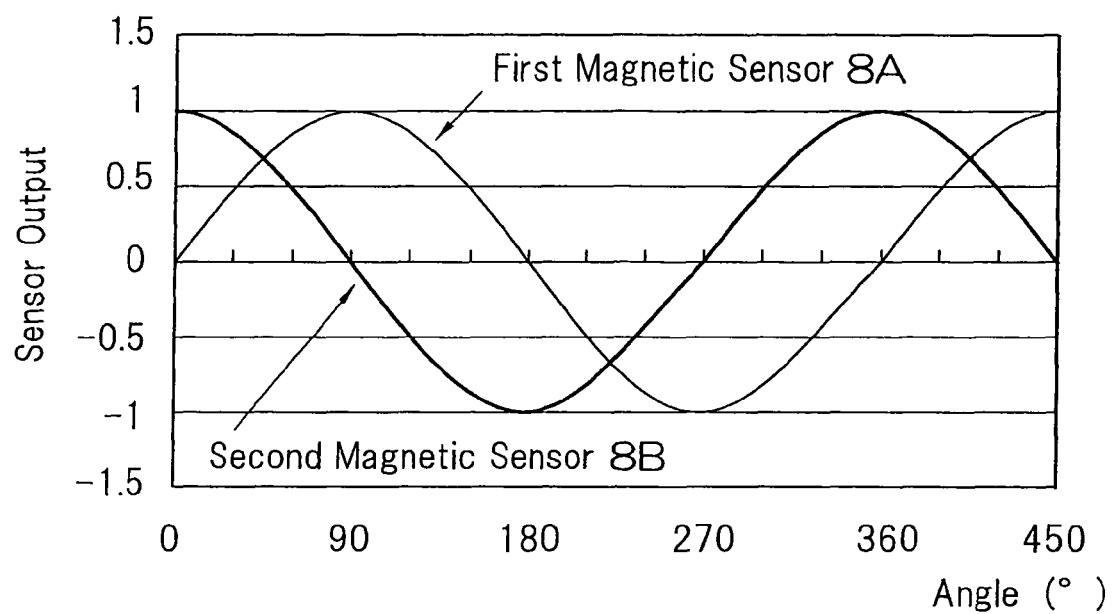
FIG. 8 is a chart showing waveforms of an output generated by a magnetic sensor unit for the detection of the absolute angle of rotation, which is employed in the bearing assembly according to the second embodiment of the present invention.

FIG. 8 illustrates a chart showing the waveforms of detection signals outputted from the first and second magnetic sensors 8A and 8B as the rotatable raceway member 2 rotates. The use of the first and second magnetic sensors 8A and 8B displaced in phase relative to each other is effective to accomplish the quadrant determination and, therefore, the absolute angle of rotation of the rotatable raceway member 2 can be measured from the respective outputs of the first and second magnetic sensors 8A and 8B. Such a signal processing for the detection of the absolute angle is carried out by an absolute angle calculating circuit (not shown) provided in the magnetic detecting circuit 9. It is, however, to be noted that the signal processing may be carried out by an external circuit.

Figure 7B:
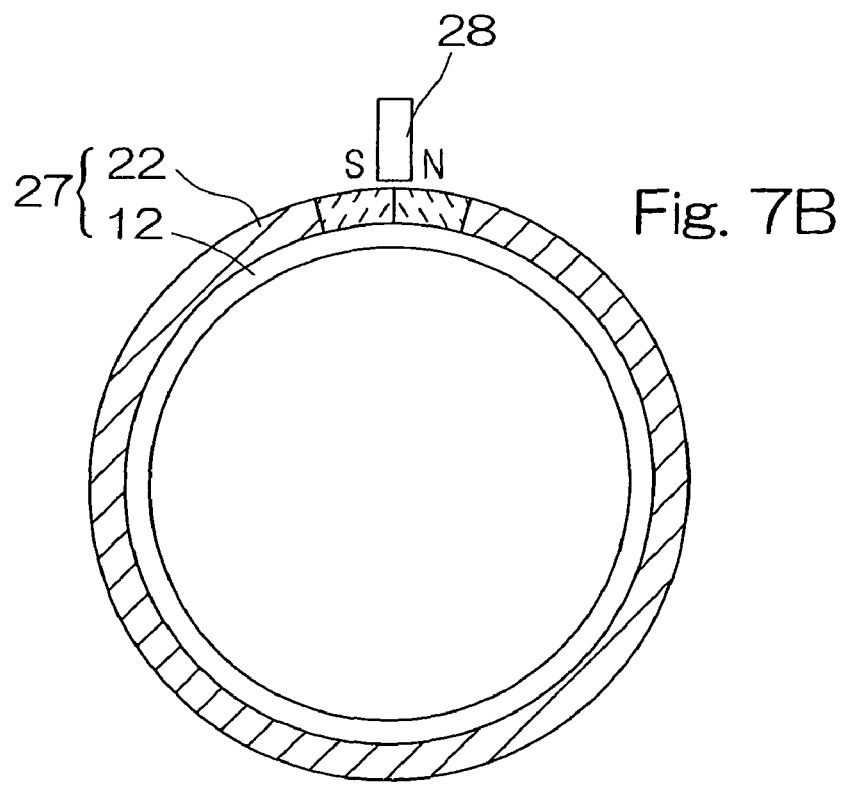
FIG. 7B is a cross-sectional view taken along the line IIb-IIb in FIG. 6.

Referring again to FIG. 6, the second to-be-detected element 27 is made up of the annular backing metal 12 and a second magnetic member 22 provided on the outer peripheral surface of the backing metal 12. The second magnetic member 22 is separate from the first magnetic member 13 of the first to-be-detected element 7 for the detection of the absolute angle, but positioned on the outer peripheral surface of the backing metal 12 or a cylindrical surface common to the first magnetic member 13 and axially next to the first magnetic member 13. This second magnetic member 22 may be of a radial type and is in the form of a sheet-like component having a magnetic characteristic varying in a direction circumferentially thereof relative to the second magnetic sensor unit 28 for the detection of the original position. The magnetic characteristic of the second magnetic member 22 of the second to-be-detected element 27 varies circumferentially with at least one polarity in the circumferential direction. In the illustrated embodiment, as shown in FIG. 7B, the second to-be-detected element 27 has a pattern of magnetization defined by a pair of N and S poles. Where the magnetization pattern is defined by a single pole, a single pole magnet is utilized. This magnetic member 22 may be employed in the form of a rubber magnet and is bonded to the backing metal 12.

Figure 9A:
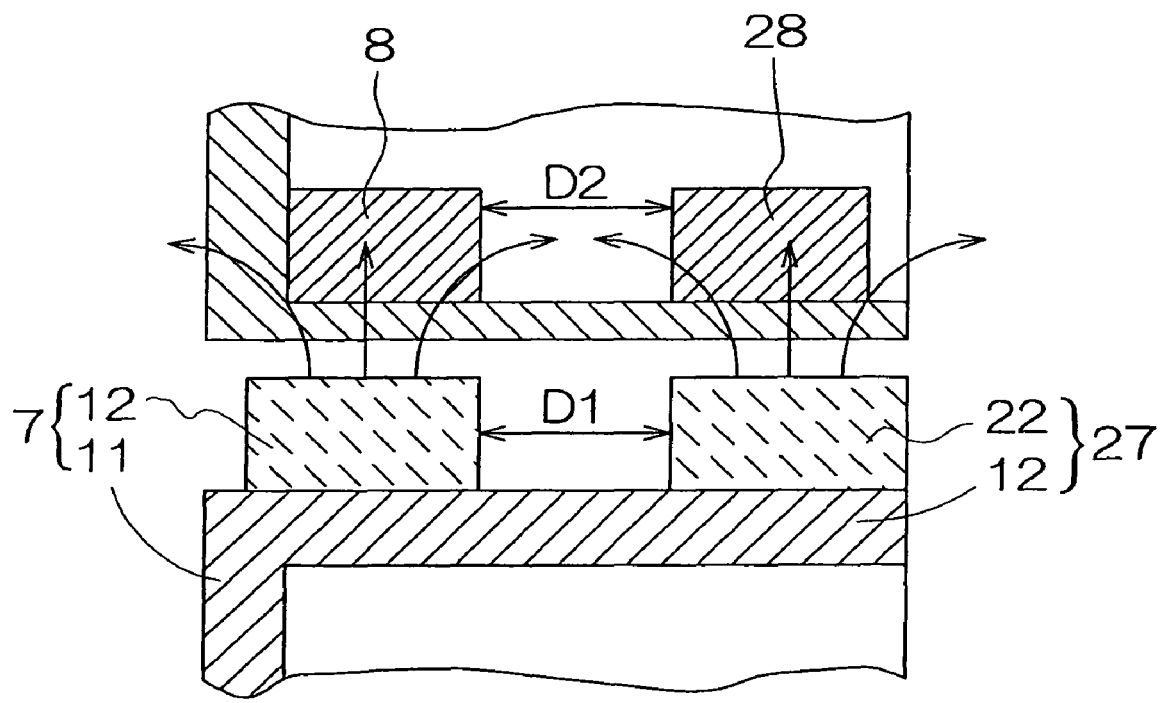
FIG. 9A is a fragmentary longitudinal sectional view, showing on an enlarged scale a portion of the bearing assembly of FIG. 6.

As shown in FIG. 9A on an enlarged scale, in the second preferred embodiment, the axial distance D1 between the magnetic member 13 of the first to-be-detected element 7 and the magnetic member 22 of the second to-be-detected element 27 is so chosen as to prevent the leakage fluxes, leaking from the first and second to-be-detected elements 7 and 27, from adversely affecting the corresponding magnetic sensor units 8 and 28. The distance D1 is, for example, 1 mm or more.

As shown in FIG. 6, the second magnetic sensor unit 28 for the detection of the original position is made up of one or more magnetic sensors capable of generating an output signal corresponding to the magnetic flux density. In the illustrated embodiment, only one magnetic sensor is employed for the second magnetic sensor unit 28. A magnetic sensor forming the magnetic sensor unit 28 for the detection of the original position is in the form of a digital sensor of a single sided or half wave magnetic responsive type or of an alternating or full wave magnetic responsive type. The magnetic sensor unit 28 is mounted on the same circuit board of the magnetic detecting circuit 9, on which the magnetic sensors 8A and 8B of the magnetic sensor unit 8 for the detection of the absolute angle are mounted and is, after having been inserted into the resinous casing 10 together with the circuit board, resin molded. In correspondence with the respective positions of the to-be-detected elements 7 and 27, the magnetic sensor units 8 and 28 are axially juxtaposed to each other.

As shown in FIG. 9A, the axial distance D2 between the first magnetic sensor unit 8 and the second magnetic sensor unit 28 is also so chosen as to avoid interference between the leakage flux emanating from the first to-be-detected element 7 and that from the second to-be-detected element 27. The distance D2 is, for example, 1 mm or more. As shown in FIG. 6, with the resinous casing 10 fixed to the stationary raceway member 3 through the metallic casing 11, the first and second magnetic sensors forming respective parts of the magnetic sensor unit 8 for the detection of the absolute angle, the magnetic sensor unit 28 for the detection of the original position and the circuit board of the magnetic detecting circuit 9 are thus carried by the stationary raceway member 3. It is to be noted that the magnetic detecting circuit 9 is utilized as a circuit operable to supply an electric power to the first and second magnetic sensors 8A and 8B and the magnetic sensor unit 28 and also to process the respective output signals from the first and second magnetic sensor units 8 and 28 before it provides an output signal. This magnetic detecting circuit 9 may be in the form of a printed circuit board having electric and/or electronic component parts mounted on one surface thereof, but may be in the form of an IC chip or any other circuit chip, or may be disposed outside the bearing assembly.

According to the foregoing embodiment shown in and described with particular reference to FIGS. 6 to 7B, since the magnetic characteristic (for example, the magnetic strength in the illustrated embodiment) cyclically varies with a cycle matching with one complete rotation of the rotatable raceway member 2 to which the to-be-detected element 7 is fixed, the absolute angle of rotation of the stationary raceway member 2 can be ascertained with no need to perform the power-on initialization. Also, since a combination of the to-be-detected element 27 and the magnetic sensor unit 28 is utilized to generate the origin signal indicative of the original position of the rotatable raceway member 2 during one complete rotation of the rotatable raceway member 2, the original position of the rotatable raceway member 2 can be detected assuredly.

In this embodiment, the to-be-detected element 7 for the detection of the absolute angle has such a magnetic characteristic as to vary substantially sinusoidally and the magnetic sensor unit 8 is made up of the first and second magnetic sensors 8A and 8B arranged in phase difference. Also, an output signal indicative of the phase difference between the first and second magnetic sensors 8A and 8B is utilized by the absolute angle calculating circuit of the magnetic detecting circuit 9. Accordingly, the absolute angle of rotation of the rotatable raceway member 2 can be accurately ascertained.

Also, in this embodiment, since the to-be-detected element 27 for the detection of the original position is disposed on the same cylindrical surface of the backing metal 12, on which the to-be-detected element 7 for the detection of the absolute angle is disposed, but spaced a distance axially from the first to-be-detected element 7, the first and second to-be-detected elements 7 and 27 can be arranged with a simplified structure.

Figure 9B:
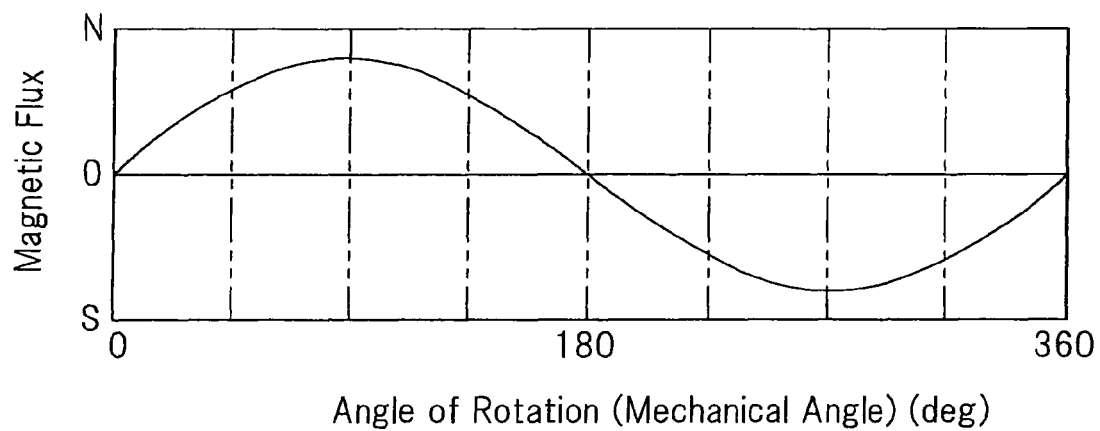
FIG. 9B is a diagram showing the pattern of magnetization of a first to-be-detected element for the detection of the absolute angle of rotation, which is employed in the bearing assembly of FIG. 6.
Figure 9C:
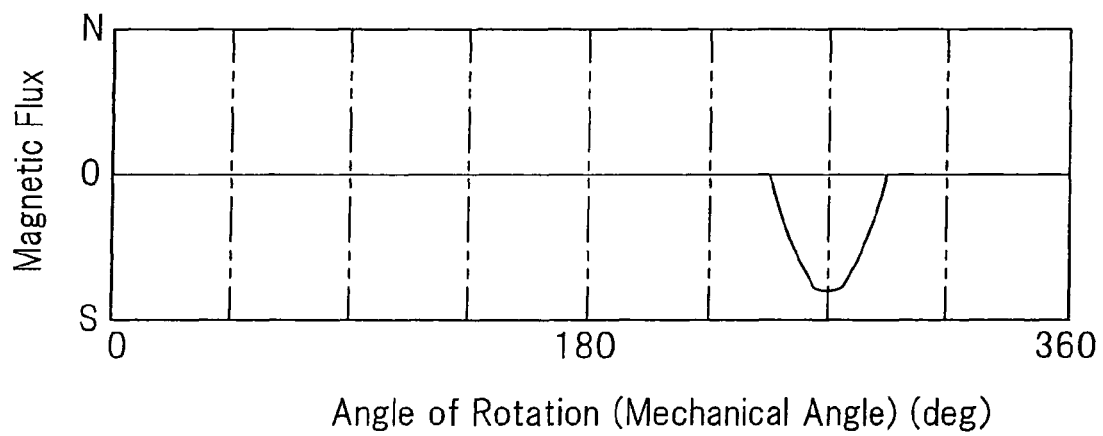
FIG. 9C is a diagram showing the pattern of magnetization of a second to-be-detected element for the detection of the original position, which is employed in the bearing assembly of FIG. 6.

In particular, in this embodiment, the axial distance D1 between the first and second to-be-detected elements 7 and 27 and the axial distance D2 between the first and second magnetic sensor units 8 and 28 are each chosen to be 1 mm or more and, as shown in FIG. 9A on an enlarged scale, leakage fluxes emanating from the first and second to-be-detected elements 7 and 27 will not interfere with each other between a combination of the first to-be-detected element 7 and the first magnetic sensor 8 and a combination of the second to-be-detected element 27 and the second magnetic sensor 28. Accordingly, the magnetic characteristic of the first to-be-detected element 7 will represent a sinusoidal waveform with no deformation as shown in FIG. 9B and, on the other hand, the magnetic characteristic of the second to-be-detected element 27 will be such as shown in FIG. 9C, wherein the magnetic characteristic only at a location where the magnetic pole pair is disposed varies locally and, therefore, the absolute angle of rotation and the original position of the rotatable raceway member 2 can be ascertained further accurately.

Figure 10A:
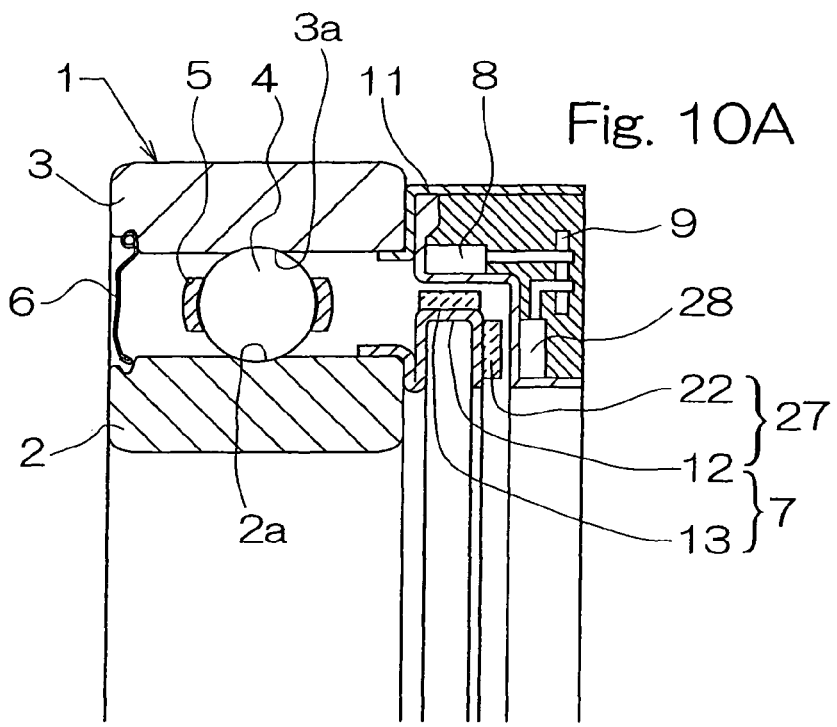
FIG. 10A is a fragmentary longitudinal sectional view of a bearing assembly with a built-in absolute encoder according to a third preferred embodiment of the present invention.
Figure 10B:
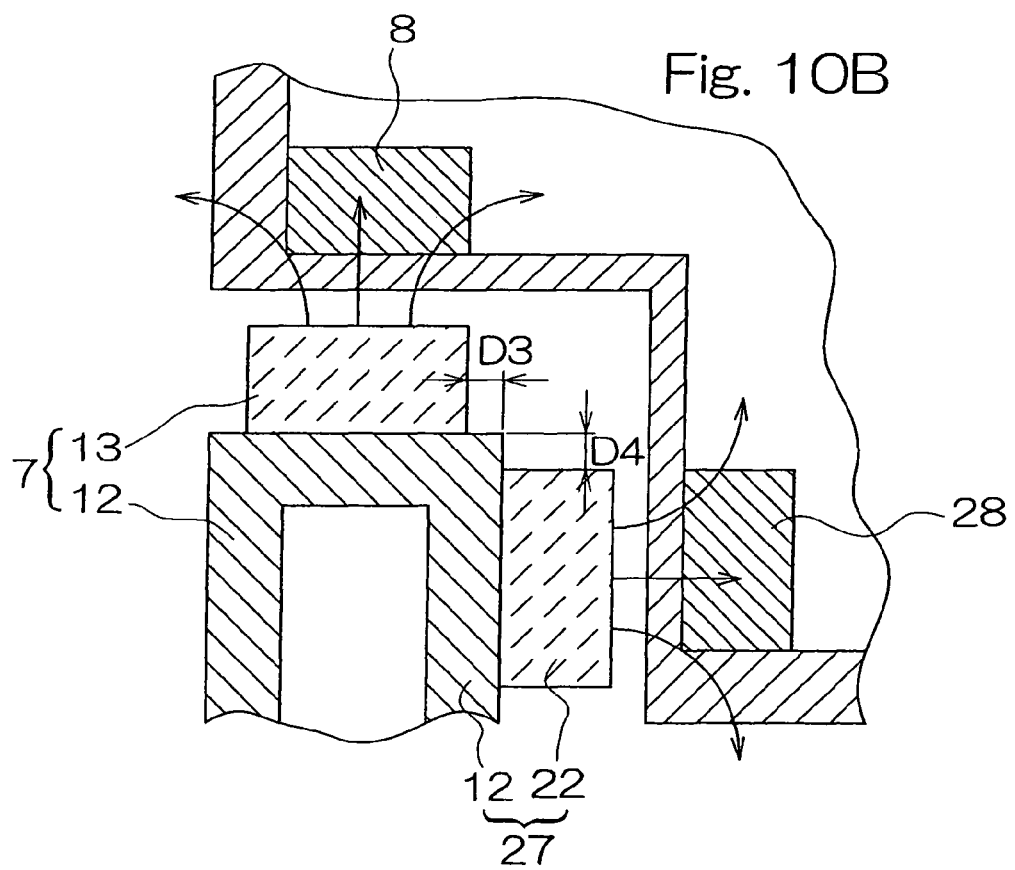
FIG. 10B is a fragmentary longitudinal sectional view, on an enlarged scale, showing a portion of the bearing assembly shown in FIG. 10A.
Figure 11:
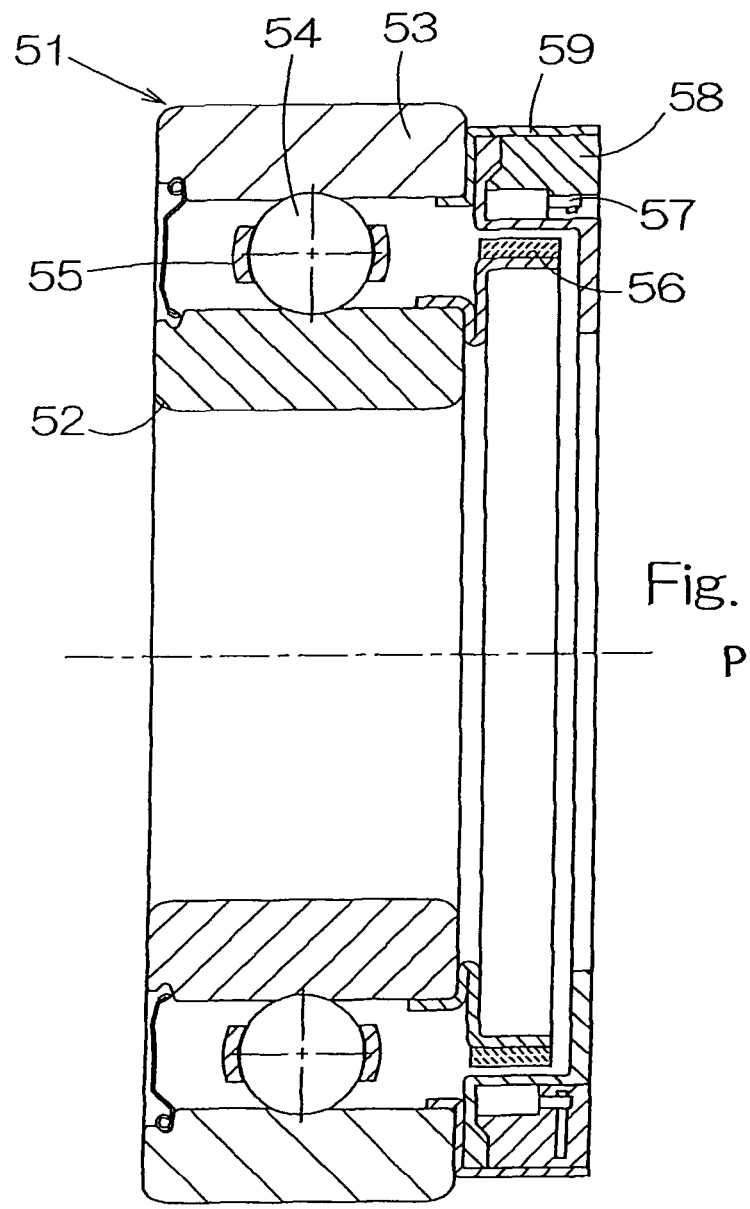
FIG. 11 is a longitudinal sectional view of the conventional bearing assembly with the built-in absolute encoder.
Figure 12:
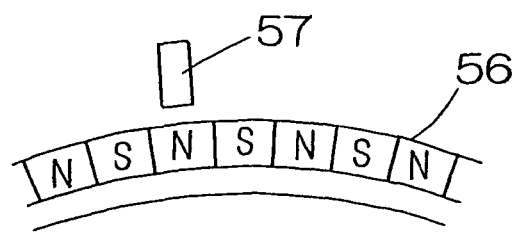
FIG. 12 is an explanatory diagram showing the relation in position between a magnetic sensor unit and a magnetic encoder both employed in the conventional bearing assembly shown in FIG. 11.
Figure 13:
FIG. 13 is a diagram showing the waveform of a detection signal generated by the magnetic sensor unit employed in the conventional bearing assembly shown in FIG. 11.
Figure 14:
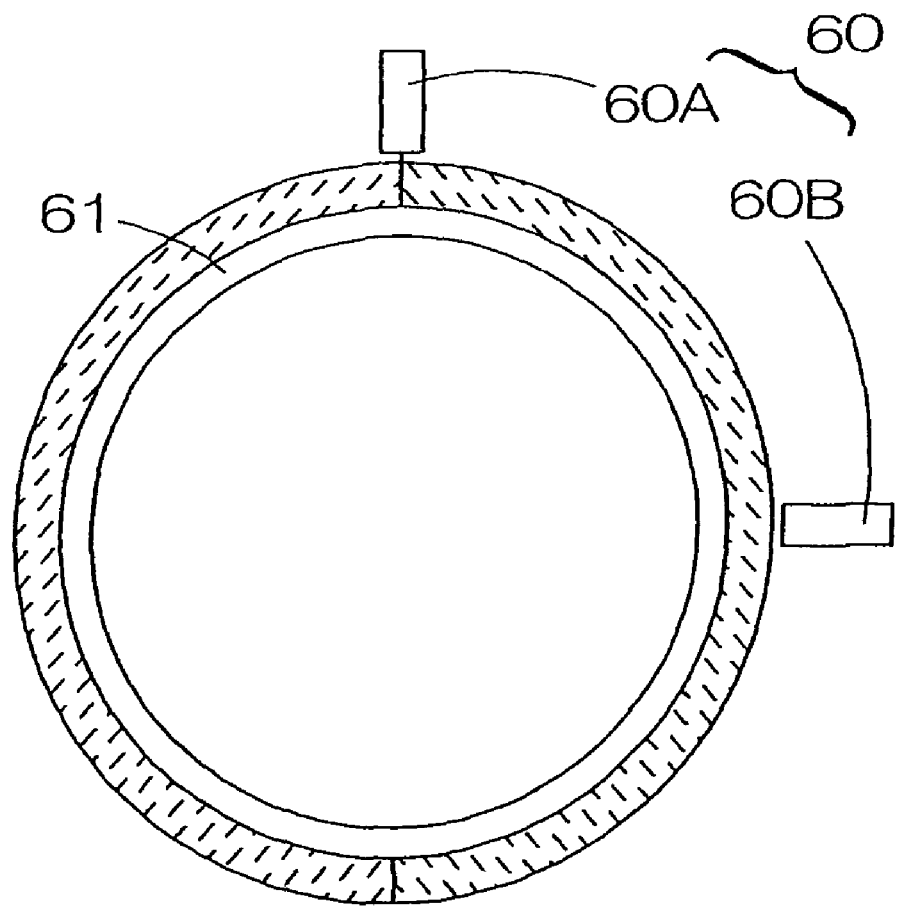
FIG. 14 is an explanatory diagram showing the relation between a to-be-detected element and a magnetic sensor unit both employed in the suggested bearing assembly shown in FIG. 11.
Figure 15:
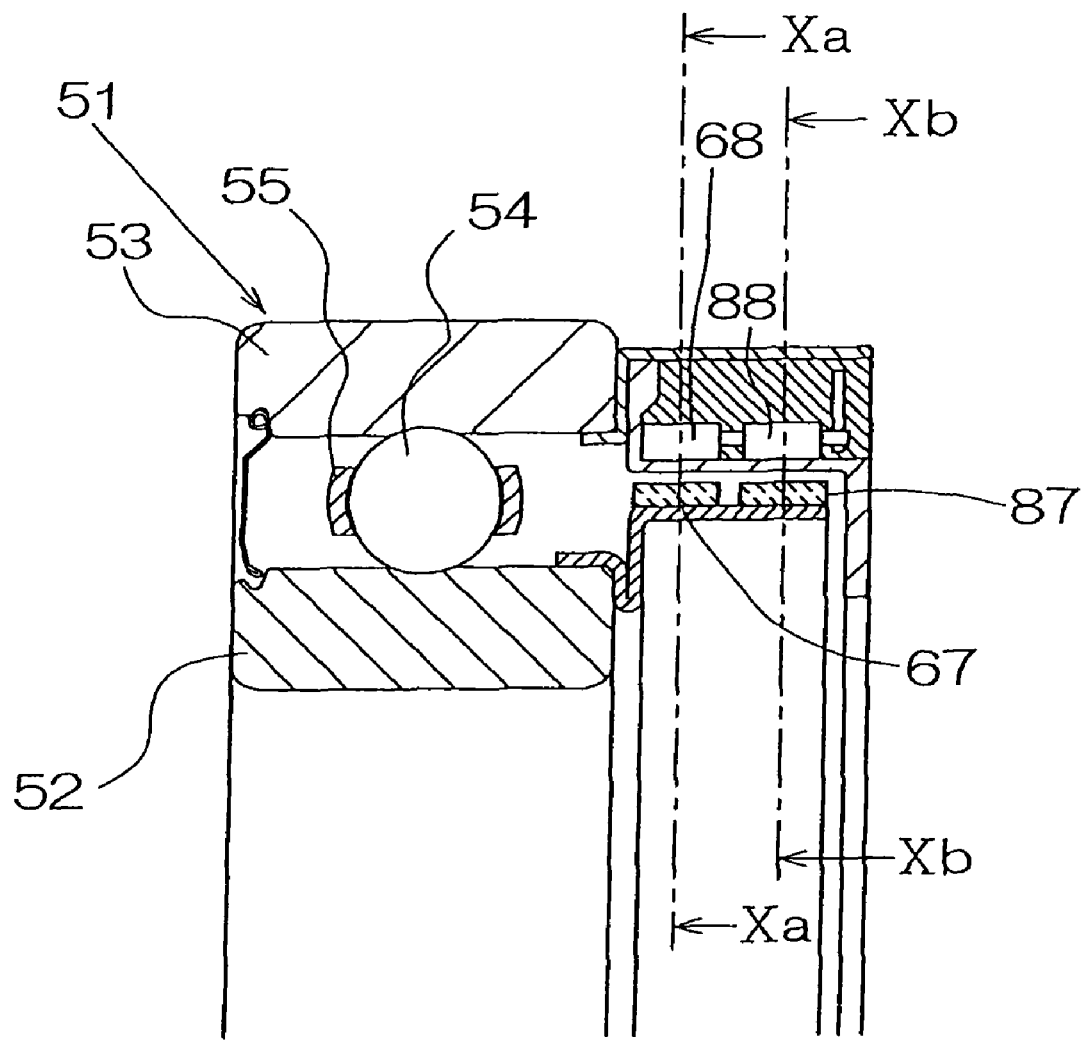
FIG. 15 is a fragmentary longitudinal sectional view of another suggested bearing assembly with a built-in absolute encoder.
Figure 16A:
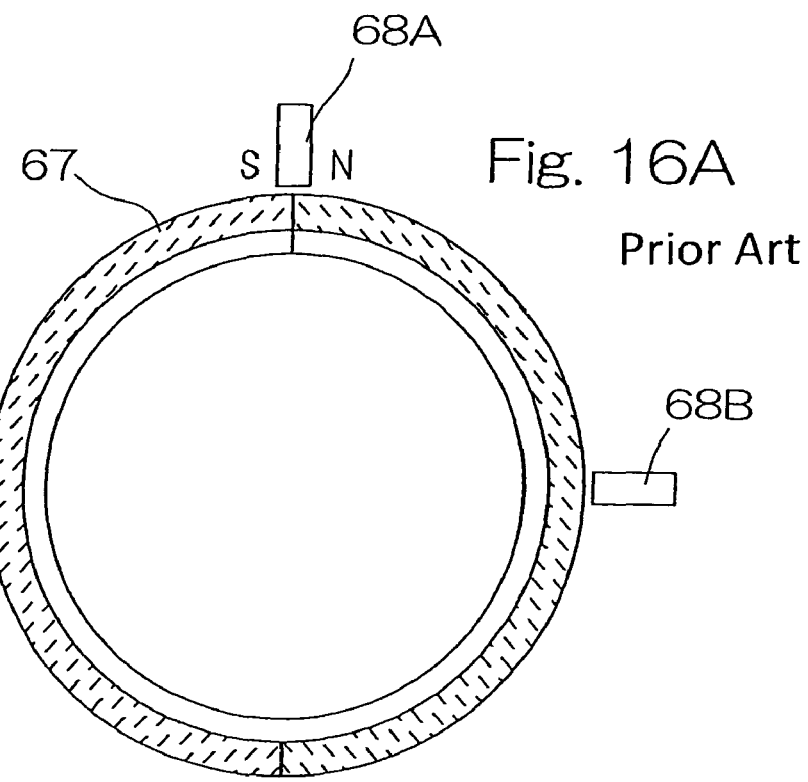
FIG. 16A is a cross-sectional view taken along the line Xa-Xa in FIG. 15.
Figure 16B:
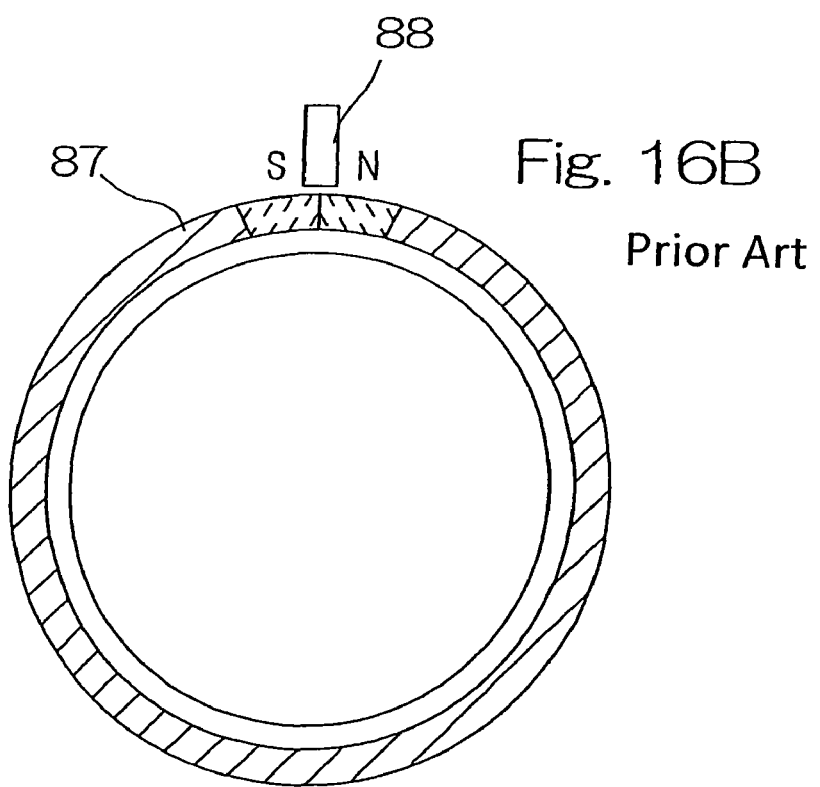
FIG. 16B is a cross-sectional view taken along the line Xb-Xb in FIG. 15.
Figure 17A:
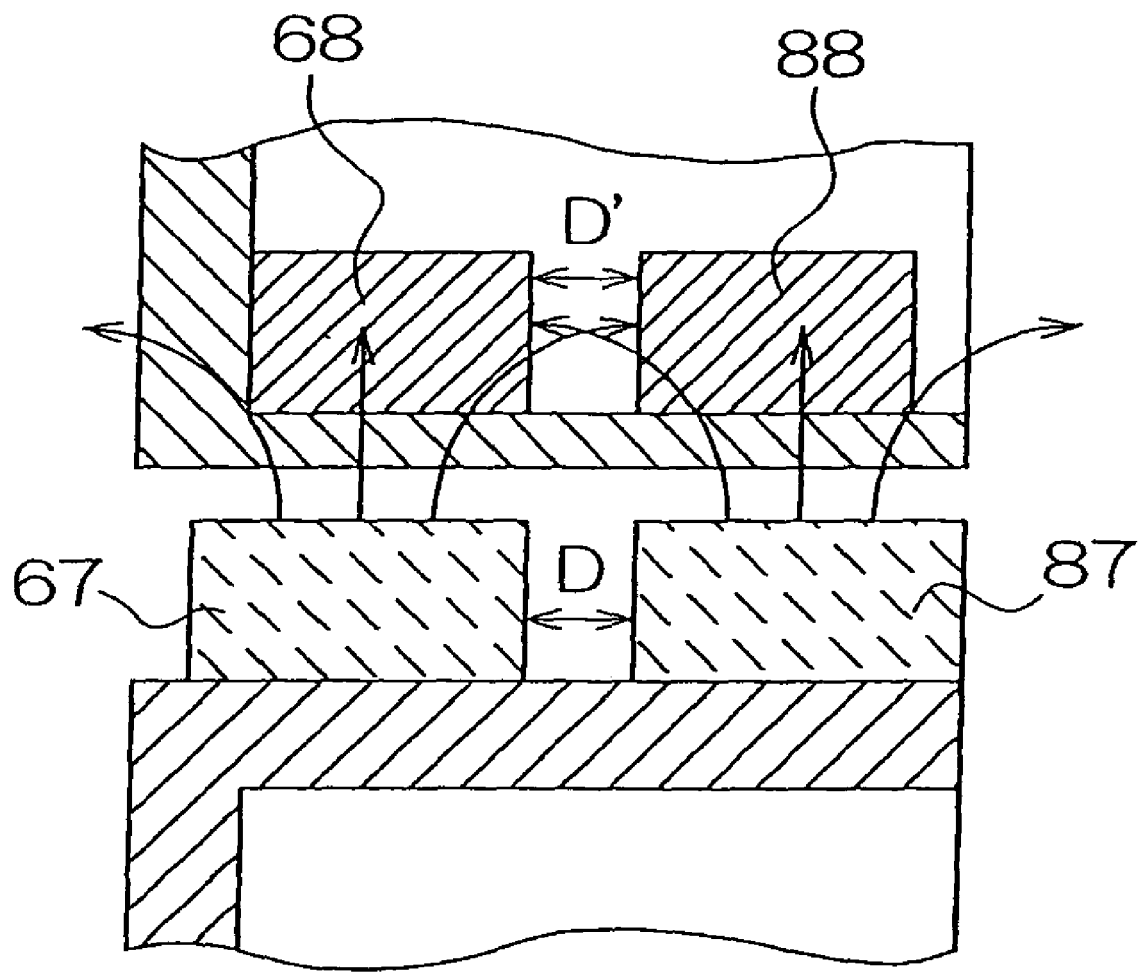
FIG. 17A is a fragmentary longitudinal sectional view, showing on an enlarged scale a portion of the bearing assembly shown in FIG. 15.
Figure 17B:
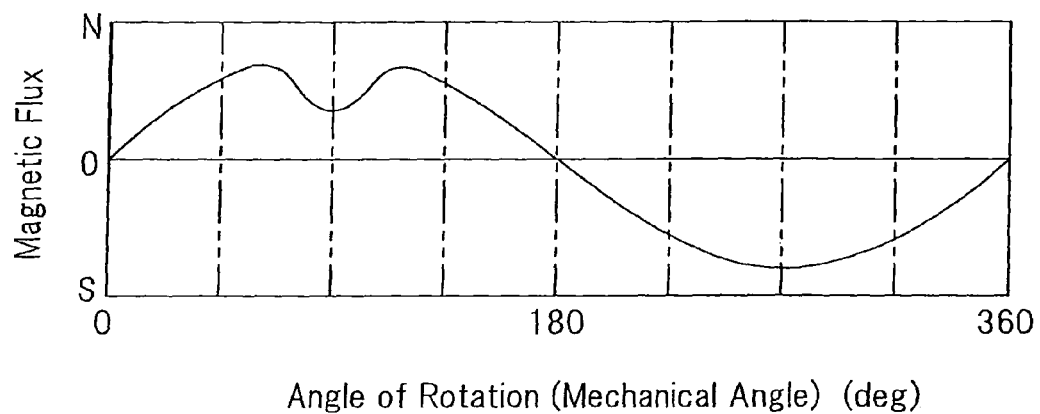
FIG. 17B is a diagram showing the pattern of magnetization of a to-be-detected element for the detection of the absolute angle of rotation.
Figure 17C:
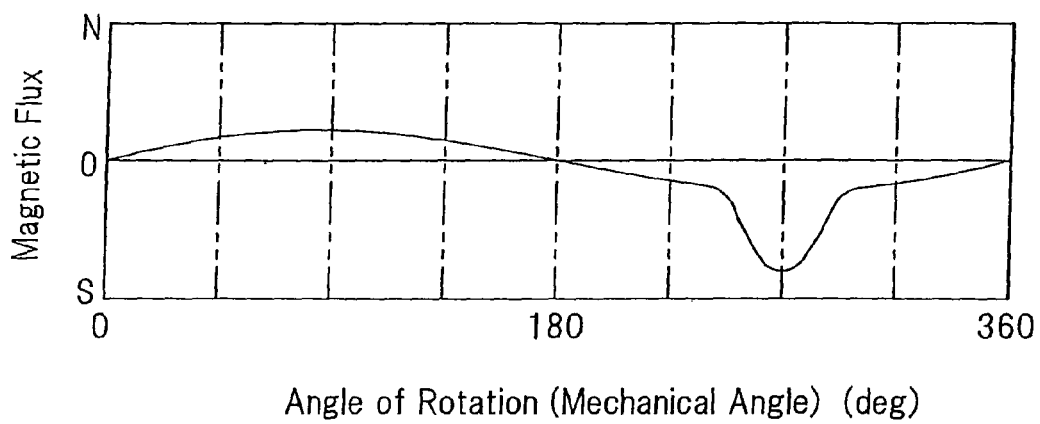
FIG. 17C is a diagram showing the pattern of magnetization of a to-be-detected element for the detection of the original position.

FIG. 10 illustrates a third preferred embodiment of the present invention. The bearing assembly of the third embodiment is similar to that of the first embodiment, except that the second magnetic member 22 for the detection of the original position is of an axial type and, correspondingly, the second magnetic sensor 28 for the detection of the original position is so disposed as to confront axially with the second magnetic member 22. In such case, as shown in FIG. 10B on an enlarged scale, the first magnetic member 13 forming a part of the first to-be-detected element 7 and the magnetic member 22 forming a part of the second to-be-detected element 27 are spaced an axial distance D3 and a radial distance D3 from each other. The axial distance D3 and the radial distance D4 are each chosen to be, for example, 0.5 mm or more so that leakage fluxes emanating from the first and second to-be-detected elements 7 and 27 will not interfere with each other between the combination of the first to-be-detected element 7 and the first magnetic sensor unit 8 and the combination of the second to-be-detected element 27 and the second magnetic sensor unit 28. Accordingly, the absolute angle of rotation and the original position of the rotatable raceway member 2 can be ascertained accurately.

In this third embodiment, since the second to-be-detected element 27 for the detection of the original position is so disposed that the direction of the magnetic field emanating from the second to-be-detected element 27 can be offset 90° relative to that emanating from the first to-be-detected element 7 for the detection of the absolute angle, it is possible to protect both the combination of the first to-be-detected element 7 and the first magnetic sensor unit 8 and the combination of the second to-be-detected element 27 and the second magnetic sensor unit 28 from being adversely affected by the leakage fluxes emanating from the first and second to-be-detected elements 7 and 27, even though the distances D3 and D4, over which the first and second to-be-detected elements 7 and 27 are spaced, are small.

Also, considering that the axial distance D3 and the radial distance D4 are chosen to be 0.5 mm or more, it is possible to ensure that the combination of the first to-be-detected element 7 and the first magnetic sensor unit 8 and the combination of the second to-be-detected element 27 and the second magnetic sensor 28 can be protected from being adversely affected by the leakage fluxes emanating from the first and second to-be-detected elements 7 and 27.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A bearing assembly having an absolute encoder built therein, comprising:

a rolling bearing including a rotatable raceway member, a stationary raceway member enclosing the rotatable raceway member with a cylindrical bearing space defined between it and the rotatable raceway member, and a circumferential row of rolling elements rollingly housed within the cylindrical bearing space and interposed between the rotatable and stationary raceway members;

a first to-be-detected element for a detection of an absolute angle, which is carried by the rotatable raceway member and has a magnetic characteristic cyclically varying in a direction circumferentially thereof;

a first magnetic sensor for the detection of the absolute angle, which is carried by the stationary raceway member in face-to-face relation with the first to-be-detected member;

a second to-be-detected element for a detection of an original position, which is carried by the rotatable raceway member at a location separate from the first to-be-detected element and has a magnetic characteristic of a single pole or a single pair of N and S poles;

a second magnetic sensor for the detection of the original position, which is carried by the stationary raceway member in face-to-face relation with the second magnetic to-be-detected element; and a magnetic detecting circuit to supply an electric power to each of the first and second magnetic sensors and to process respective output signals from the first and second magnetic sensors to generate to an external circuit a signal indicative of the absolute angle of rotation of the rotatable raceway member and an origin signal indicative of an original position of the rotatable raceway member during one complete rotation of the rotatable raceway member relative to the stationary raceway member, wherein a combination of the first to-be-detected element and the first magnetic sensor for the detection of the absolute angle and a combination of the second to-be-detected element and the second magnetic sensor for the detection of the original position are positioned to be immune from leakage fluxes emanating from the first and second to-be-detected elements, respectively, and the first to-be-detected element has a magnetic characteristic represented by a sinusoidal waveform with each cycle matching with one complete rotation of the rotatable raceway member and the second to-be-detected element is disposed with its direction of a magnetic field offset 90° from the direction of the magnetic field of the first to-be-detected element.

2. The bearing assembly having the absolute encoder built therein as claimed in claim 1, wherein the first and second to-be-detected elements are spaced an axial distance of 0.5 mm or more and a radial distance of 0.5 mm or more from each other.

* * * * *